United States Patent
Hutchins et al.

(12)
(10) Patent No.: US 6,424,686 B1
(45) Date of Patent: Jul. 23, 2002

(54) MAXIMUM LIKELIHOOD DETECTION WITH DIFFERENCE METRICS AND PROGRAMMED COEFFICIENTS

(75) Inventors: Robert Allen Hutchins; Sushama Mahesh Paranjape, both of Tuscon, AZ (US); Gene Ho Sonu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,420

(22) Filed: Mar. 31, 1999

(51) Int. Cl.[7] .................................................. H03D 1/00
(52) U.S. Cl. ...................................................... 375/341
(58) Field of Search .................. 375/341, 316, 375/262; 714/794, 795

(56) References Cited

U.S. PATENT DOCUMENTS

| | | | |
|---|---|---|---|
| 5,321,559 A | 6/1994 | Nguyen et al. | 360/46 |
| 5,345,342 A | 9/1994 | Abbott et al. | 360/48 |
| 5,422,760 A | 6/1995 | Abbott et al. | 360/46 |
| 5,432,803 A * | 7/1995 | Liu et al. | 375/340 |
| 5,533,067 A * | 7/1996 | Jamal et al. | 375/232 |
| 5,650,988 A | 7/1997 | Kuribayashi | 369/59 |
| 5,661,760 A | 8/1997 | Patapoutian et al. | 375/341 |
| 6,289,060 B1 * | 9/2001 | Chen | 375/341 |

* cited by examiner

*Primary Examiner*—Chi Pham
*Assistant Examiner*—Khai Tran
(74) *Attorney, Agent, or Firm*—John H. Holcombe

(57) ABSTRACT

A maximum likelihood detector and a method for maximum likelihood detection of digital samples of channel output of data recorded as analog signals representing a finite number of states. The method comprises, first, providing at least two numerical metric coefficients. The coefficients are derived from the difference between metrics directly associating "0" and "1" states of the recorded signal. The coefficients are respectively applied to each sequential digital sample to generate alternative metrics, and each respective alternative metric is compared to a previous difference metric based on a previous digital sample. Based on the comparison, one of a plurality of provided metrics is selected which minimizes the mean squared error with respect to the previous metric. Then, the one of the finite number of states represented by the selected metric is identified, and a maximum likelihood path memory is set to a maximum likelihood state dictated by the identified one of the finite states, thereby detecting the recorded analog signals. The numerical coefficients may be programmed based on different removable media and the probability that the samples comprise a data sequence.

28 Claims, 12 Drawing Sheets if CSD0=0, CSD1=0, then $DJ_k = g_6 y_k + P_6$ (case 3)
if CSD0=0, CSD1=1, then $DJ_k = -DJ_{k-1} + g_5 y_k + P_5$ (case 2)
if CSD0=1, CSD1=0, then $DJ_k = DJ_{k-1} + g_3 y_k + P_3$ (case 0)
if CSD0=1, CSD1=1, then $DJ_k = g_4 y_k + P_4$ (case 1)

MAXIMUM LIKELIHOOD DETECTION WITH DIFFERENCE METRICS AND PROGRAMMED COEFFICIENTS

TECHNICAL FIELD

This invention relates to maximum likelihood detection of data recorded as analog signals representing a finite number of states, and, more particularly to reduction of errors resulting from maximum likelihood detection.

BACKGROUND OF THE INVENTION

Maximum likelihood detection of data recorded as analog signals and detected from partial response samples is highly advantageous in magnetic disk drives, where the disks and heads are fixed and non-removable. The characteristics of the channel are fixed, including the particular disk media, the particular recording and read heads, the linear velocity and flying height between the disk media and the recording and read heads, and the recording and read electronics. The channel characteristics can be measured and, once known, tend to remain constant. Additionally, a specific code may be employed which maximizes the distances between the sensed states. Only limited changes are taken into account, such as differences in data rates between inner and outer tracks, minor servo offtrack operation, minor disk defects, and some head wear over time. Thus, a specific maximum likelihood detection circuit can be designed which is specific to the type of disk drive and which will have a low error rate at high recording densities. Further, such minor changes have been accommodated by employing digital FIR (finite impulse response) filters whose coefficients are programmable, thus changing the frequency response of the filters to better match the signal being read to the maximum likelihood detector. Examples include, U.S. Pat. No. 5,321,559, Nguyen et al., U.S. Pat. No. 5,365,342, Abbott et al., and U.S. Pat. No. 5,442,760, Abbott et al.

It becomes more difficult to use such maximum likelihood detection with recording devices which have removable media.

Removable media devices tend to be mass storage devices which allow data to be recorded on media which is removed from the device and stored elsewhere, such as in the storage shelves of an automated data storage library, or in true archive storage outside of a drive or library on storage shelves or in boxes and other containers. The amount of data so stored quickly becomes very large and, if a new and upgraded media is introduced, there is a desire on the part of the user to resist re-recording all of the archived data onto the upgraded media. Hence, a backwards compatibility is typically required for removable media devices. Examples of removable media devices include optical disk and optical tape storage, which may be read-only, write-once, and rewritable media, and be different types of media, such as molded, magneto-optic and phase-change media.

Optical media is subject to variation from media to media in recorded data output characteristics based on the type of media, above, variation in media materials between manufacturers and over time, and between recording densities.

Another example of removable media devices includes magnetic tape recording, which have media to media variation based on different data densities on the same type of media, different types of media such as chromium-based, nickel-based, ferrous-based media, or between materials used by different manufacturers. Additionally, tape media may have differing thicknesses and therefore differing media to head (flying and contact) characteristics over the recording and read head, resulting in differing head to media spacings.

Maximum likelihood detection in such differing circumstances is exceedingly difficult, and may require a different maximum likelihood detector for each circumstance.

Further, in the context of a single drive type, the drives may have an alignment of the head with respect to the media which differs between drives, also resulting in differing channel characteristics.

The use of a changeable FIR, as in the above patents, is unlikely to compensate for the change in channel characteristics.

Additionally, the maximum likelihood trellis for maximum likelihood detection conventionally utilizes continuing accumulation of metrics until the accumulation reaches an overflow condition, and the register containing the accumulated metric is then reset, normalizing the accumulated value.

SUMMARY OF THE INVENTION

It is therefore an object of the present invention to provide maximum likelihood detection of data recorded as analog signals representing a finite number of states which reduces errors resulting from maximum likelihood detection with normalized values.

Disclosed are a maximum likelihood detector and a method for maximum likelihood detection of digital samples of data recorded as analog signals representing a finite number of states, the digital samples representing the channel output of recorded analog signals at a predetermined timing with respect thereto. The method comprises the steps of:

providing numerical metric coefficients relating to the probability of the digital samples comprising a data sequence;

respectively applying the numerical metric coefficients to each of the digital samples to generate alternative metrics;

providing a previous metric which comprises a difference metric function of a previous digital sample;

selecting the one of the respective generated alternative metrics which minimizes the mean squared error with respect to the previous metric;

identifying the one of the finite number of states represented by the selected metric; and responding to the identified one of the finite states, setting a maximum likelihood state detector to a maximum likelihood state dictated by the identified one of the finite states, the set maximum likelihood state detecting the recorded analog signals.

Each separate set of metric coefficients may comprise programmed numerical metric coefficients relating to the probability of the samples comprising a data sequence under different detection characteristics.

The alternative metrics are compared to the previous metric, and, the selection of the provided metric is based upon the comparison.

The numerical metric coefficients are derived from the difference between metrics directly associating "0" and "1" states of the recorded signal. This insures that there is no unbounded accumulation of metrics.

The derived numerical coefficients are applied to each of the digital samples to provide at least one difference metric. A lot plurality of alternative metrics are generated relating to the digital samples. The one of the respective generated alternative metrics is selected which remains within defined positive and negative bounds by comparing the generated alternative metrics to the difference metric. The one of the finite number of states represented by the selected metric is identified, and the maximum likelihood detector is set, detecting the analog signal.

Where the recorded analog signals having the different detection characteristics are recorded on different media, the step of programming each metric coefficient may be conducted based upon an identification of the different media.

The programmed numerical metric coefficients may be derived from logarithmic relationships of the digital samples to the finite number of states.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
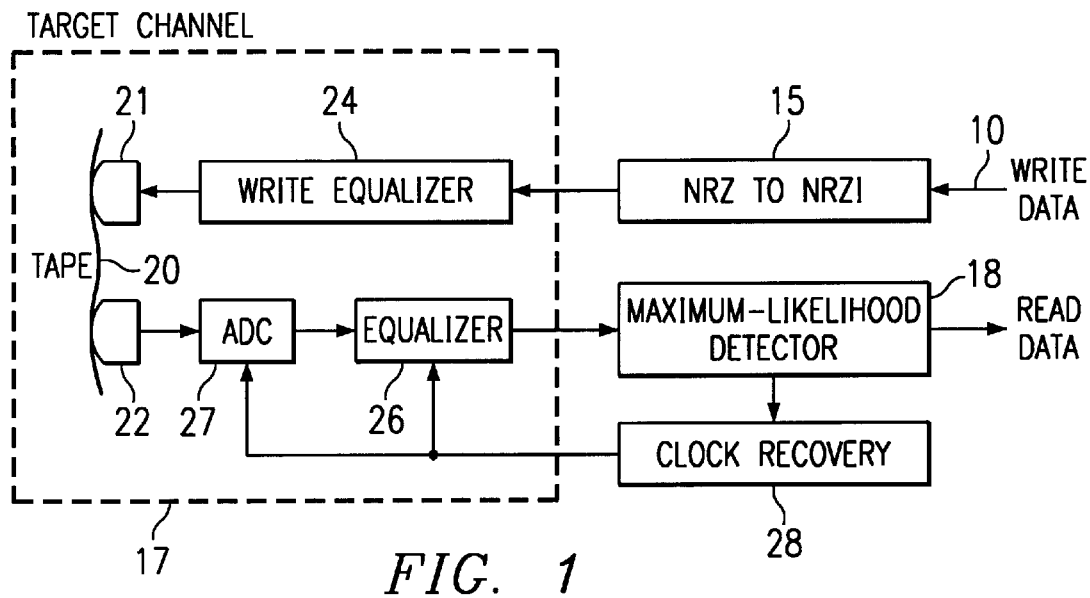
FIG. 1 is a diagrammatic representation of a channel which may implement the present invention.
Figure 2:
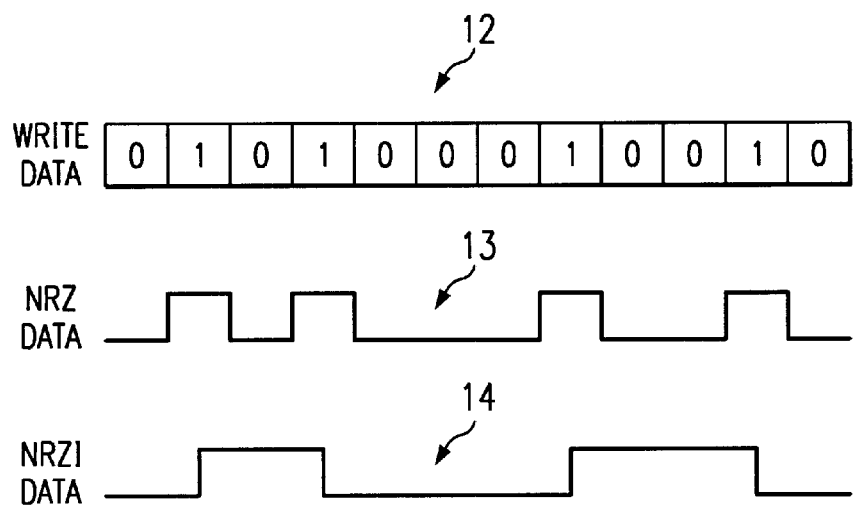
FIG. 2 is a representation of a stream of write data and its corresponding representation in NRZ and NRZI.

Referring to FIGS. 1 and 2, a write-read channel is illustrated in FIG. 1 that implements the present invention for write data, such as that illustrated in FIG. 2, as supplied at an input 10. Typical binary data 12 is signaled as NRZ data 13, having a signal voltage for each one bit and no signal voltage for each zero bit. When binary data is recorded on data storage media, the data is typically converted to NRZI data 14 by circuit 15 and supplied to a target channel 17 to reduce the number of data pulses and thereby to allow storage of greater quantities of data in the same space. Thus, it is this NRZI data that a maximum likelihood detector 18 must use to base its reconstruction of the write data 12.

The typical target channel 17 is designed to reproduce the data as faithfully as possible within reasonable cost constraints. Although a tape system employing a tape media 20 and write and read heads 21 and 22 is illustrated, optical or magnetic disk systems may also be employed. In any of the systems, a write equalizer 24 and a read equalizer 26 are employed to offset to some extent certain non-linearities of the media and drive systems and to provide the read signals at the same amplitude. In maximum likelihood detection systems, the read equalizer 26 is digital and an analog to digital converter 27 is employed to provide the digital samples of the output of the read head 22 indicating the signal amplitudes, and a clock recovery circuit 28 is provided to insure that the digital samples have the correct timing.

Figure 3A:
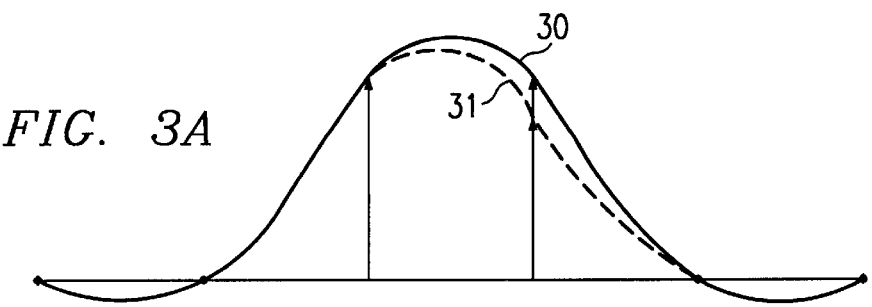
FIGS. 3A–3D are diagrams of channel impulse response curves, including exemplary sample times.
Figure 3B:
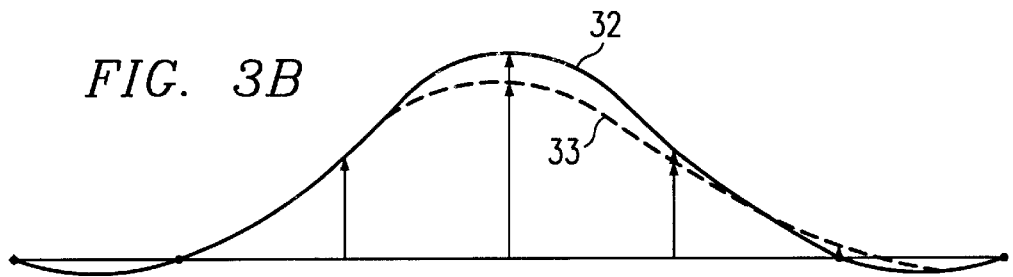
Figure 3C:
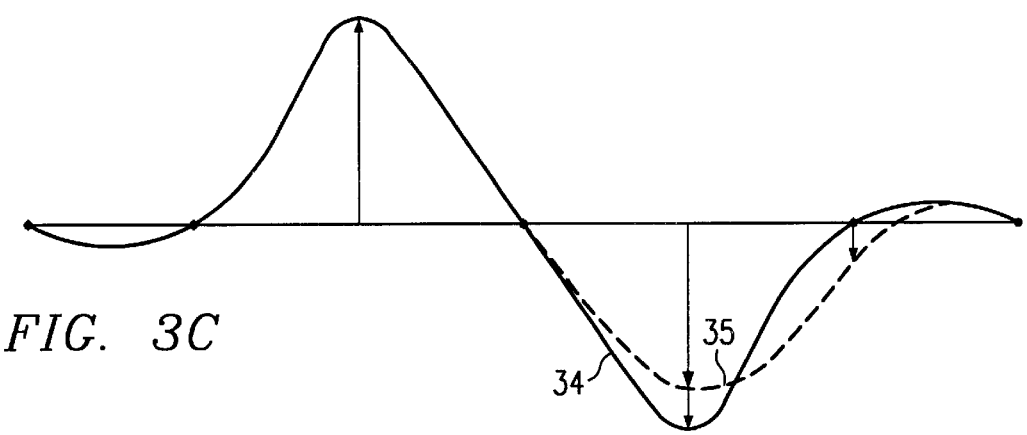
Figure 3D:
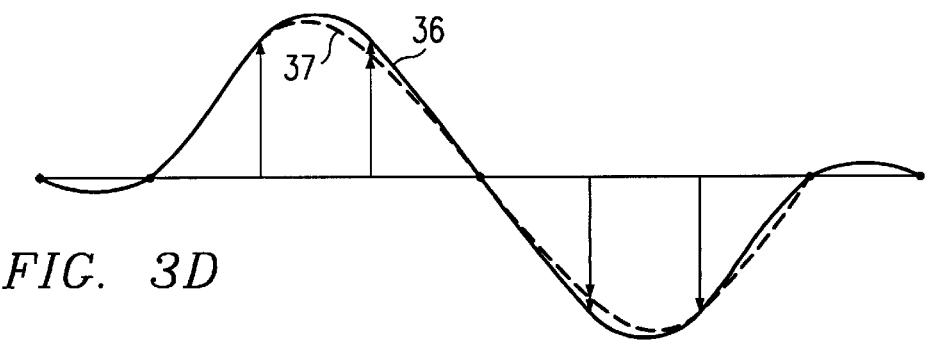
Figure 4A:
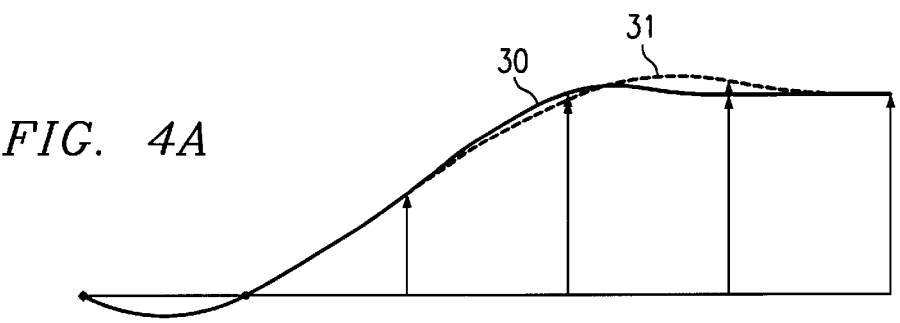
FIGS. 4A–4D are diagrams of channel step response curves, including exemplary sample times.
Figure 4B:
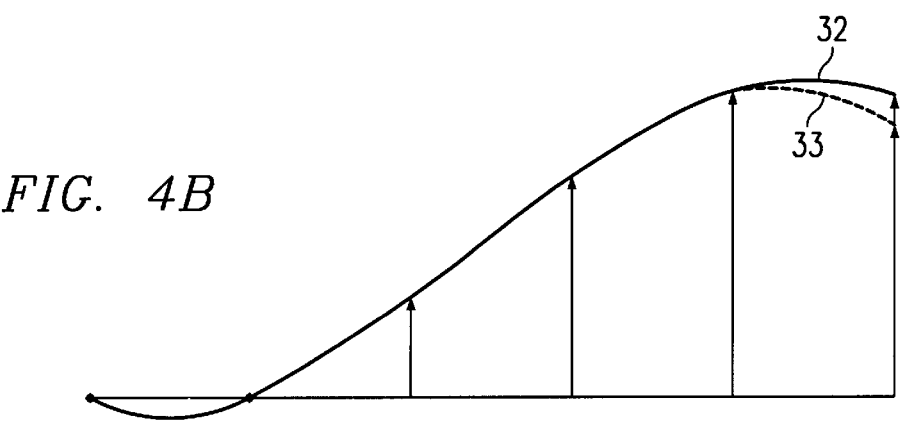
Figure 4C:
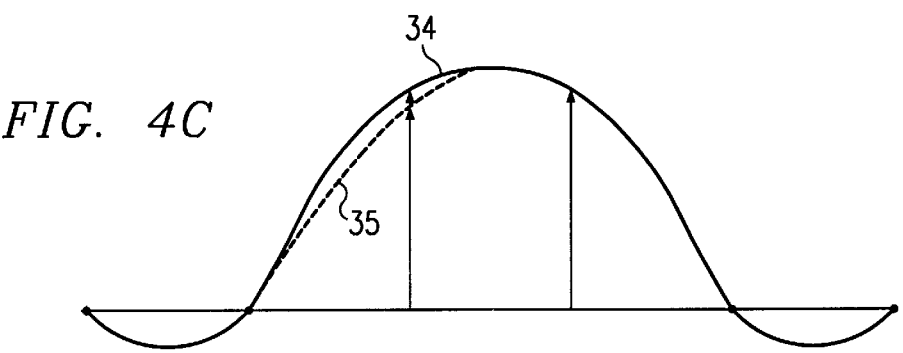
Figure 4D:
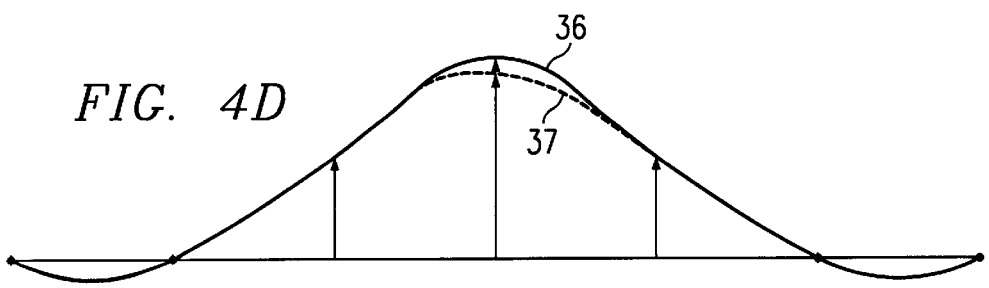

FIGS. 3A–3D are diagrams of channel impulse response curves, and FIGS. 4A–4D are diagrams of channel step response curves, including exemplary sample times. FIGS. 3A and 4A illustrate the ideal class PR I impulse and step response curves 30 and first order samples, and non-ideal impulse and step response 31 and first order samples which are not equal, such as may be encountered in an optical storage system. FIGS. 3B and 4B illustrate the ideal class PR II impulse and step response curves 32 and second order samples, and non-ideal impulse and step response 33 and second order samples which are not exact multiples and are not equal, also such as may be encountered in an optical storage system. FIGS. 3C and 4C illustrate the ideal class PR IV impulse and step response curves 34 and second order samples, and non-ideal impulse and step response curves 35 and second order samples that are unequal and offset, such as may be encountered in a magnetic tape storage system. FIGS. 3D and 4D illustrate the ideal class Extended PR IV impulse and step response curves 36 and third order samples, and non-ideal impulse and step response curves 37 and third order samples that are unequal, such as may also be encountered in a magnetic tape storage system.

As is well known, the idealized classes allow simplified maximum likelihood detection by having digital samples that are integrally related so that it is easy to calculate the appropriate metrics. As described above, maximum likelihood detection of magnetic disk drives, where the disks and heads are fixed and non-removable can have the equalizers 24 and 26 of FIG. 1 designed so that the idealized signals are provided to the maximum likelihood detector.

However, also as described above, it becomes more difficult to use such maximum likelihood detection with recording devices which have removable media.

Examples of removable media devices include optical disk and optical tape storage. Optical media is subject to variation from media to media in recorded data output characteristics based on the type of media, above, variation in media materials between manufacturers and over time, and variation in recording densities.

Another example of removable media devices includes magnetic tape recording systems, which have media to media variation based on different data densities on the same type of media, different types of media such as chromium-based, nickel-based, ferrous-based media, or between materials used by different manufacturers. Additionally, tape media may have differing thicknesses and therefore differing media to head (flying and contact) characteristics over the recording and read head, resulting in differing head to media spacings.

Maximum likelihood detection in such differing circumstances is exceedingly difficult, and may require a different maximum likelihood detector for each circumstance.

Thus, in accordance with the one aspect of the present invention, the maximum likelihood detector metrics are programmed with at least one numerical metric coefficient relating to the probability of the digital samples comprising a data sequence.

Figure 5:
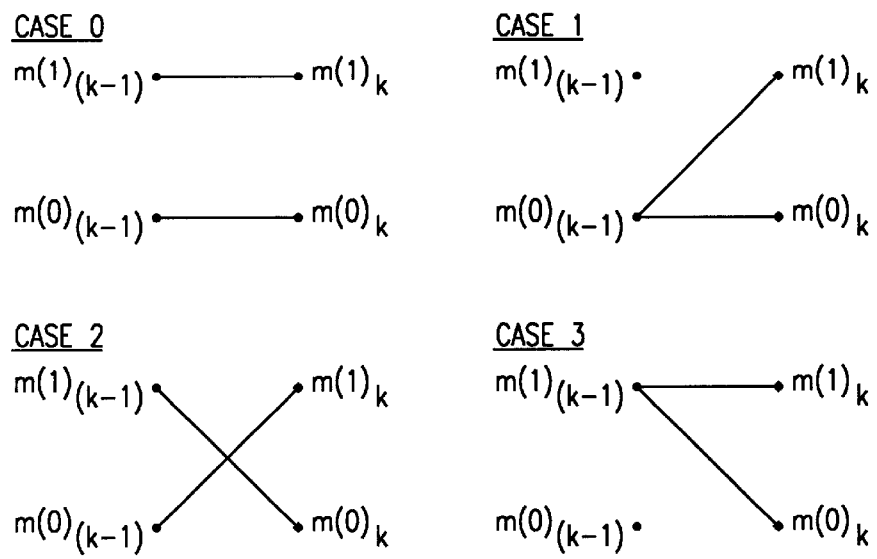
FIG. 5 is a diagram of an example of a maximum likelihood trellis branching from one sample to the next for first order detection.

For example, the first order maximum likelihood detection of digital samples of data recorded as analog signals 30 or 31 of FIGS. 3A and 4A, having two finite states, is illustrated in FIG. 5, showing the possible maximum likelihood trellis branching from one sample to the next for first order detection of the "0" and "1" states of the recorded signal. In the example of FIG. 5, each point selected for Cases "0", "1", "2" and "3" is determined for a particular media for a particular head by determining (e.g., by calculation or measurement) the mean value for each point. The mean values are then employed in metric equations to assess the various Cases and then the equations are solved to determine particular metric coefficients, which in the normal case of removable media signals 31 do not have the idealized integral relationship of the class PR I signals 30.

In accordance with the present invention, programmed multiplicative and additive metric coefficients allow the maximum likelihood detector to be adaptable. The detector is thus able to accommodate changes to the transfer function of the channel, for example, by a change of media, changing the mean of probability functions for the data of the channel.

Figure 6:
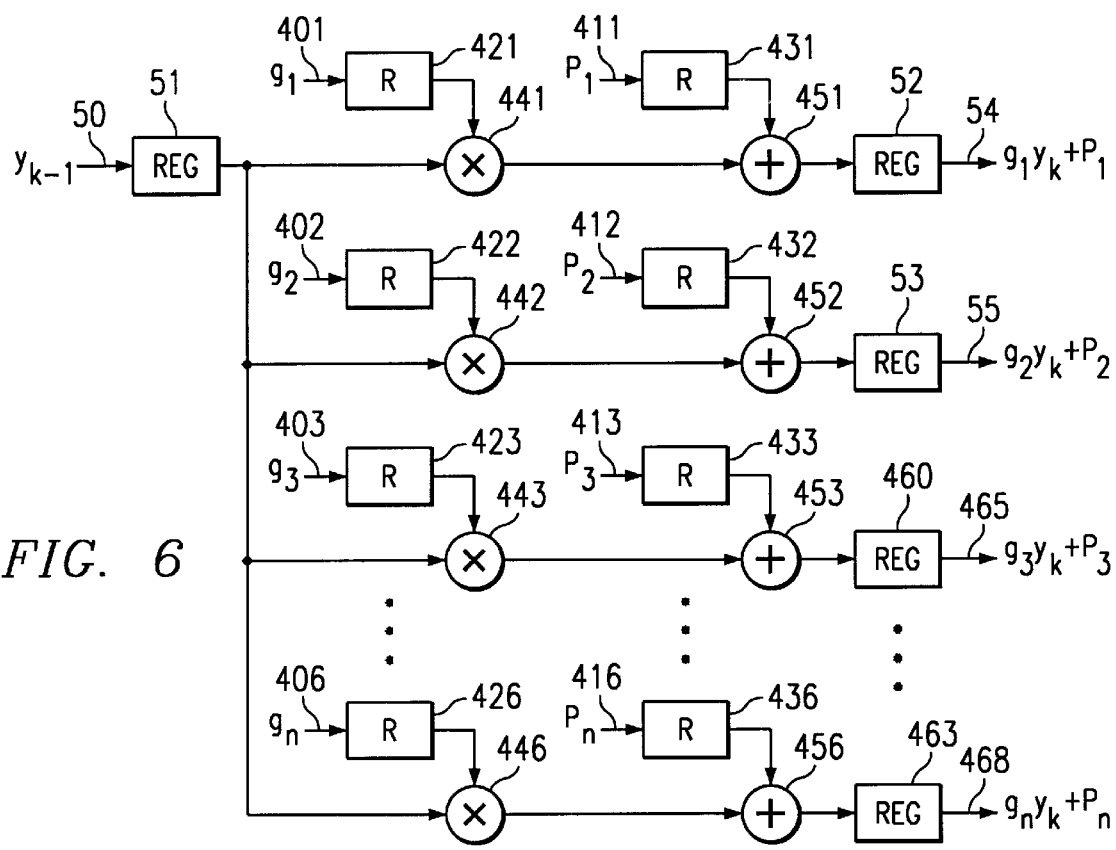
FIG. 6 is a block diagram of programming inputs and logic for applying programmed metric coefficients to digital samples of channel output signals to provide metrics thereof in accordance with the present invention.
Figure 7:
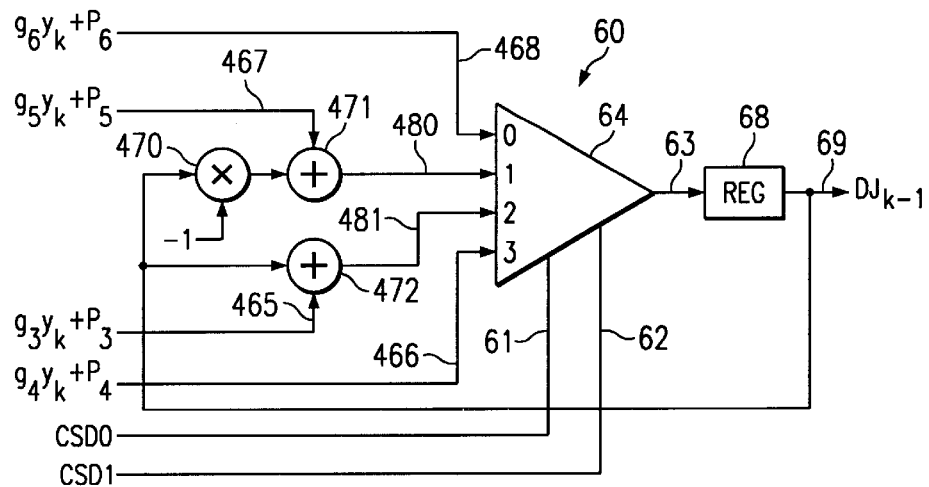
FIGS. 7 and 8 are a block diagrams of logic for providing selected first order difference metrics from the metrics of the circuit of FIG. 6, and selecting the maximum likelihood branch which minimizes the mean squared error with respect to the previous finite maximum likelihood state in accordance with the present invention.
Figure 8:
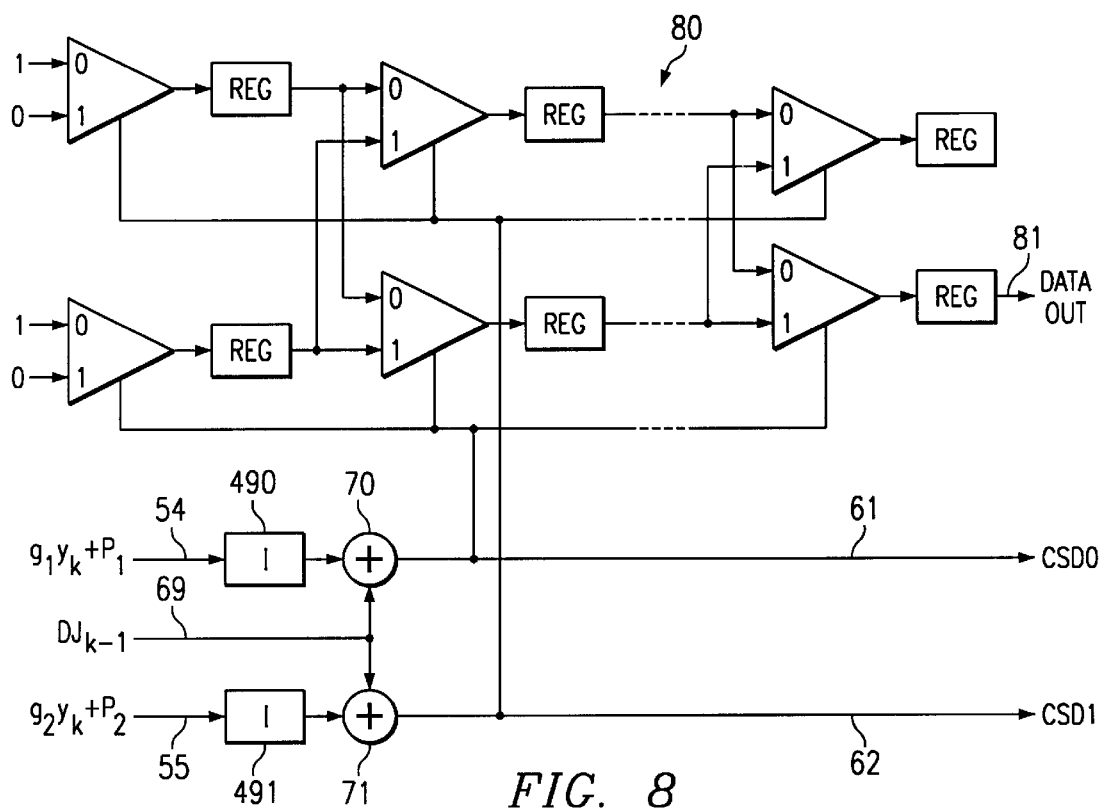

The metric coefficients are derived, in accordance with another aspect of the present invention, for use with difference metrics. Logic for implementing the derived metric coefficients is provided, the numerical metric coefficients are determined from the mean of probability functions, and programmed into the logic. FIGS. 6–8 illustrate an embodiment of logic implementing the invention for first order maximum likelihood detection, FIGS. 10–13 illustrate an embodiment for second order maximum likelihood detection, and FIGS. 14–19 illustrate an embodiment for third order maximum likelihood detection.

For the purpose of illustration, the methodology and equations for the first order maximum likelihood detection difference metrics of the signals and samples illustrated in FIGS. 3A and 4A will be described in detail.

The channel sample $y_k$ is the function of the input bits $a_k$, and $a_{k-1}$. The goal of the maximum likelihood detector is to produce an accurate estimate of the channel input sequence $\{a_k\}$ by observing the pulse amplitude modulated sequence $\{y_k\}$. As is known by those of skill in the art, the maximum likelihood detector does this by maximizing the likelihood function $p(y_k|s_0; \{a_k\})=p(y_k|s_k; \{a_k\})$, where $s_0$=the initial state, and $s_k$=the current state. The probability of the given output sample at time k depends only upon the current state of the system and the possible input $a_k \epsilon \{0,1\}$. The total likelihood function can be described as:

$$p(y_k|s_0; \{a_k\})=\Pi_k p(y_k|s_k; \{a_k\}).$$

Taking the natural log of the likelihood function:

$$\ln[p(y_k|s_0; \{a_k\})]=\Sigma_k \ln[p(y_k|s_k; \{a_k\})].$$

The power of the maximum likelihood detector is derived through its recursive nature. The log of the likelihood function is accumulated into metrics at each sample time k, with the most likely estimates being saved in metrics and the least likely estimates being rejected.

In a first order linear maximum likelihood detection system, the overall channel function is $F(D)=f_0+f_1 D$, where D=one sample delay. With this channel function, in the absence of noise and at sampling time k, the output sequence $\{y_k\}=f_0 a_k + f_1 a_{k-1}$. For an input $a_k \epsilon \{a_0, a_1\}$, where $a_0$ represents a binary 0 and $a_1$ represents a binary 1, in a linear system:

$$Y_k \epsilon \{a_0 f_0 + a_0 f_1 = \mu_0,\ a_0 f_0 + a_1 f_1 = \mu_1,\ a_1 f_0 + a_0 f_1 = \mu_2,\ a_1 f_0 + a_1 f_1 = \mu_3\},$$

Alternatively, for non-linear systems, the resultant mean value ($\mu_x$) can be measured from the actual system response.

For this system, at any time k, there are two metrics:

$$m(0)_k = \text{maximum } m(0)_{k-1} + \ln[p(y_k|s_k = 0; a_0)]$$
$$m(1)_{k-1} + \ln[p(y_k|s_k = 1; a_0)]$$
$$m(1)_k = \text{maximum } m(0)_{k-1} + \ln[p(y_k|s_k = 0; a_1)]$$
$$m(1)_{k-1} + \ln[p(y_k|s_k = 1; a_1)]$$

where $s_k = 0$ if $a_{k-1} = a_0$ and $s_k = 1$ if $a_{k-1} = a_1$

The channel signal $\{y_k\}$ is a random process which contains an ideal signal perturbed by noise. If it is assumed that $y_k$ is perturbed by the zero mean additive white gaussian noise of variance $\delta^2$, then:

$$\ln[p(y_k|s_k=0;a_0)]=-((y_k-\mu_0)^2/2\ \delta^2)-(1/2)\ln[2\ \pi\delta^2]$$
$$\ln[p(y_k|s_k=0;a_1)]=-((y_k-\mu_2)^2/2\ \delta^2)-(1/2)\ln[2\ \pi\delta^2]$$
$$\ln[p(y_k|s_k=1;a_0)]=-((y_k-\mu_1)^2/2\ \delta^2)-(1/2)\ln[2\ \pi\delta^2]$$
$$\ln[p(y_k|s_k=1;a_1)]=-((y_k-\mu_3)^2/2\ \delta^2)-(1/2)\ln[2\ \pi\delta^2]$$

After the removal of the constant terms, the metric equations become:

$$m(0)_k = \text{maximum } m(0)_{k-1} + 2\mu_0 Y_k - \mu_0^2$$
$$m(1)_{k-1} + 2\mu_1 Y_k - \mu_1^2$$
$$m(1)_k = \text{maximum } m(0)_{k-1} + 2\mu_2 Y_k - \mu_2^2$$
$$m(1)_{k-1} + 2\mu_3 Y_k - \mu_3^2$$

As described above, the metrics are difficult to implement in that there are no bounds on the size of the metrics, and they must be normalized in order for them to work with limited capacity registers.

In accordance with the present invention, by employing difference metrics, the size of the metric register is constrained within known bounds. Thus, the derived metric coefficients will be employed for use with difference metrics.

Referring additionally to FIG. 5, for the first order maximum likelihood detector, there are four ways that the trellis diagram can branch from one sampling time to the next, respectively called "Case 0", "Case 1", "Case 2", and "Case 3".

The metric coefficients of the difference metrics are derived, employing the "cases" of FIG. 5.

Thus, employing difference metrics:

1. For Case 0 to have occurred:

$$m(0)_k + 2\mu_0 y_k - \mu_0^2 > m(1)_{k-1} + 2\mu_1 y_k - \mu_1^2$$

$$m(0)_k + 2\mu_2 y_k - \mu_2^2 < m(1)_{k-1} + 2\mu_3 y_k - \mu_3^2$$

Defining $$DJ_k = m(1)_k - m(0)_k$$

if $$DJ_{k-1} < 2(\mu_0 - \mu_1)y_k + (-\mu_0^2 + \mu_1^2);$$

and $$DJ_{k-1} > 2(\mu_2 - \mu_3)y_k + (-\mu_2^2 + \mu_3^2);$$

then Case 0 has occurred and $DJ_k = DJ_{k-1} + 2(\mu_3 - \mu_0)y_k + (-\mu_3^2 + \mu_0^2)$;
Defining:

$$g_1 = 2(\mu_0 - \mu_1) \text{ and } P_1 = -\mu_0^2 + \mu_1^2,$$

$$g_2 = 2(\mu_2 - \mu_3) \text{ and } P_2 = -\mu_2^2 + \mu_3^2,$$

$$g_3 = 2(\mu_3 - \mu_0) \text{ and } P_3 = -\mu_3^2 + \mu_0^2;$$

that $DJ_{k-1} < g_1 y_k + P_1$; and $DJ_{k-1} > g_2 y_k + P_2$;
then, Case 0 has occurred, so that $$DJ_k = DJ_{k-1} + g_3 y_k + P_3.$$

2. If $$DJ_{k-1} < 2(\mu_0 - \mu_1)y_k + (-\mu_0^2 + \mu_1^2);$$

and $$DJ_{k-1} < 2(\mu_2 - \mu_3)y_k + (-\mu_2^2 + \mu_3^2);$$

then Case 1 has occurred and $DJ_k = 2(\mu_2 - \mu_0)y_k + (\mu_2^2 + \mu_0^2)$;
Defining:

$$g_1 = 2(\mu_0 - \mu_1) \text{ and } P_1 = -\mu_0^2 + \mu_1^2,$$

$$g_2 = 2(\mu_2 - \mu_3) \text{ and } P_2 = -\mu_2^2 + \mu_3^2,$$

$$g_4 = 2(\mu_2 - \mu_0) \text{ and } P_4 = -\mu_2^2 + \mu_0^2;$$

so that $Dj_{k-1} < g_1 y_k + P_1$; and $DJ_{k-1} < g_2 y_k + P_2$;
then, Case 1 has occurred, so that $$DJ_k = g_4 y_k + P_4.$$

3. If $$DJ_{k-1} > 2(\mu_0 - \mu_1)y_k + (-\mu_0^2 + \mu_1^2);$$

and $$DJ_{k-1} < 2(\mu_2 - \mu_3)y_k + (-\mu_2^2 + \mu_3^2);$$

then Case 2 has occurred and $DJ_k = -DJ_{k-1} + 2(\mu_2 - \mu_1)y_k + (\mu_2^2 + \mu_1^2)$
Defining:

$$g_1 = 2(\mu_0 - \mu_1) \text{ and } P_1 = -\mu_0^2 + \mu_1^2,$$

$$g_2 = 2(\mu_2 - \mu_3) \text{ and } P_2 = -\mu_2^2 + \mu_3^2,$$

$$g_5 = 2(\mu_2 - \mu_1) \text{ and } P_5 = -\mu_2^2 + \mu_1^2;$$

so that $DJ_{k-1} > g_1 y_k + P_1$; and $DJ_{k-1} < g_2 y_k + P_2$;
then Case 2 has occurred, so that $$DJ_k = -DJ_{k-1} + g_5 y_k + P_5.$$

4. If $$DJ_{k-1} > 2(\mu_0 - \mu_1)y_k + (-\mu_0^2 + \mu_1^2);$$

and $$DJ_{k-1} > 2(\mu_2 - \mu_3)y_k + (-\mu_2^2 + \mu_3^2);$$

then Case 3 has occurred and $DJ_k = 2(\mu_3 - \mu_1)y_k + (-\mu_3^2 + \mu_1^2)$;
Defining:

$$g_1 = 2(\mu_0 - \mu_1) \text{ and } P_1 = -\mu_0^2 + \mu_1^2,$$

$$g_2 = 2(\mu_2 - \mu_3) \text{ and } P_2 = -\mu_2^2 + \mu_3^2,$$

$$g_6 = 2(\mu_3 - \mu_1) \text{ and } P_6 = -\mu_3^2 + \mu_1^2;$$

so that $DJ_{k-1} > g_1 y_k + P_1$; and $DJ_{k-1} > g_2 y_k + P_2$;
then Case 3 has occurred, so that $$DJ_k = g_6 y_k + P_6.$$

The sample outputs of the expected waveforms are determined, for example, by measuring a number of sample outputs for waveforms with known inputs, and calculating the mean values of each of the sample points, and the metric coefficient numerical values are calculated for the mean values of the sample outputs, thereby providing the numerical metric coefficients.

Thus, in accordance with the present invention, the metric coefficients are derived from the difference between metrics directly associating "0" and "1" states of the recorded signal.

FIG. 6 illustrates an embodiment of the present invention for providing programming inputs 401, 402, 411 and 412 for supplying programmed metric coefficients "$g_1$", "$g_2$", "$P_1$" and "$P_2$" respectively to registers 421, 422, 431 and 432. As described above, the metric coefficients $g_1$ and $g_2$ are multiplier (product) metric coefficients, and the metric coefficients $P_1$ and $P_2$ are additive (offset) metric coefficients. The programmed metric coefficients are respectively applied by logic 441, 442, 451 and 452 to each digital sample of channel output signals "y" supplied at input 50 and delayed ("k" indicates the delay time in terms of sequential digital samples) by register 51. The application of the metric coefficients provides alternative metrics thereof at registers 52 and 53, respectively at outputs 54 and 55.

The alternative metrics are employed in a maximum likelihood detector for comparison to a function of the current sample and a prior selected metric in order to select the metric which minimizes the mean squared error with respect to the previous metric. Thus, the programming inputs 401, 402, 411 and 412 allow the alternative metrics to be tailored to the particular media which is being read.

In higher order maximum likelihood detectors, additional programming inputs may be provided to generate additional alternative metrics, as will be explained.

Programming inputs 403–406 and 413–416 respectively supply programmed metric coefficients "$g_3$"–"$g_N$", "$P_3$"–"$P_N$" to registers 423–426 and 433–436, which are employed, in accordance with another aspect of the present invention, to calculate the various difference metrics for the various cases, for example, of FIG. 5. Again, as described above, the metric coefficients $g_3$–$g_N$ are multiplier (product) metric coefficients, and the metric coefficients $P_3$ and $P_N$ are additive (offset) metric coefficients. The programmed metric coefficients are respectively applied by logic 443–446, 453–456 to each digital sample of channel output signals "y" supplied at input 50 and delayed by register 51.

For the example of the cases of FIG. 5, 4 sets of metric coefficients are employed for the calculation of 4 difference metrics for 4 possible cases, employing the above described equations. Thus, registers 460–463 respectively supply outputs 465–468 representing respectively, $g_3y_k+P_3$, $g_4y_k+P_4$, $g_5y_k+P_5$, and $g_6y_k+P_6$.

Since the metric coefficients "$g_1$"–"$g_N$" and "$P_1$"–"$P_N$" are derived from the difference between metrics directly associating "0" and "1" states of the recorded signal for first order maximum likelihood detection, this insures that no accumulation of metrics is unbounded, and there is never an overflow at the difference metric register.

Thus, the programmed metric coefficients "$g_1$"–"$g_6$" and "$P_1$"–"$P_6$" derived from the above are supplied, in FIG. 6, at programming inputs 401–406 and 411–416 to registers 421–426 and 431–436. The programmed metric coefficients are respectively applied by logic 441–446 and 451–456 to each digital sample "y" supplied at input 50. The resultant outputs are stored in registers 52–53 and 460–463, delayed and supplied on outputs 54–55 and 465–468 to the logic of FIG. 7.

In FIG. 7, the outputs 465–468 are further processed and selectively combined with a previous metric from register 68, by logic 470–472, in accordance with the above "case" equations. Thus, the difference metrics are provided on inputs 468, 480, 481 and 466 to a multiplexor 64, the metric on line 481 representing case "0", on input 466 representing case "1", on input 480 representing case "2", and on input 468 representing case "3". As the result, the provided metrics are related to the programmed metric coefficients and to the previous metric 68.

Use of the difference metrics and resultant difference metric coefficients allows a selector 60 of FIG. 7, which responds to the inputs at lines 61 and 62, to select as the difference metric "$DJ_k$" 63 at multiplexor 64 from between the calculated metrics of inputs 468, 480, 481 or 466 of multiplexor 64. The signals on lines 61 and 62 have binary values, which, when taken together, represent the four cases and operate the multiplexor 64 to gate the one of the inputs 468, 480, 481 or 466 represented by the particular case. The cases are encoded by the state of the lines 61 and 62 from FIG. 8, a negative signal indicating a binary "1" and a positive signal indicating a binary "0", resulting in the two lines representing the four cases. The selection of one of the provided difference metrics of inputs 468, 480, 481 and 466, insures that the resultant metric on output 63 remains within defined bounds.

The cases designated on lines 61 and 62 are generated by comparing the alternative metrics on inputs 54 and 55 (from FIG. 6) to the previous difference metric.

The difference metric "$DJ_k$" 63 at multiplexor 64 is delayed in register 68 and supplied on output 69 after one delay time as "$DJ_{(k-1)}$" to adders 70 and 71 of FIG. 8. Each respective alternative metric "$g_1y_k+P_1$" and "$g_2y_k+P_2$" from outputs 54 and 55 is supplied to invertors 490 and 491 for multiplying by minus one and are added to the previous difference metric "$DJ_{(k-1)}$" 69 by adders 70 and 71 to provide the respective positive and negative states on outputs 61 and 62 which identify the one of the finite number of cases represented by the selected accumulated metric. Effectively, the adders 70 and 71 provide a comparison of the metrics to the previous difference metric. The states on outputs 61 and 62 are used to select the next difference metric "$DJ_k$" 63 at multiplexor 64, and are used to select a trellis path in path memory 80 to a maximum likelihood state dictated by the identified finite state. The path memory 80 will provide the appropriate data bit at output 81.

The use, in accordance with the present invention, of a difference metric "$DJ_k$" 63 employs only a single metric selection, as opposed to the prior methods.

Figure 20:
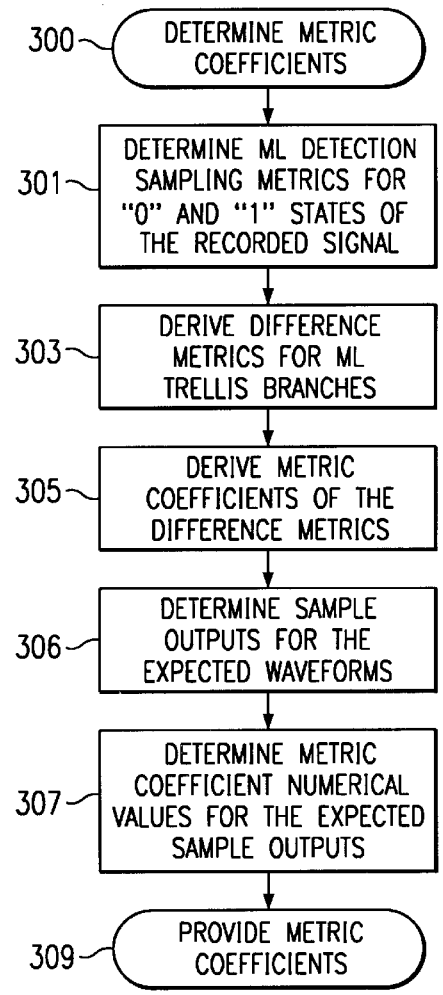
FIG. 20 is a flow chart depicting the methodology in accordance with the present invention for determining metric coefficients for programming the logic of FIG. 6.

The flow chart of FIG. 20 depicts the methodology in accordance with the present invention for determining metric coefficients 300 derived for use with difference metrics. The first step 301 is to determine the maximum likelihood detection sampling metrics for the "0" and "1" states of the recorded signal as a function of the previous state.

In accordance with the present invention, step 303 is provided to derive difference metrics for various cases defining the maximum likelihood trellis branches. By employing difference metrics, the size of the metric register is constrained within known bounds.

Specifically, the difference metrics comprise the difference between metrics for two sequential samples. Multiple difference metrics represent, respectively, the differences between many means of samples, which, when all are considered, completely span the entire state space. The difference metrics may derived in different ways, but the equations still reduce to the same structure and are based on the same fundamentals including timing.

Referring additionally to FIG. 5, for the first order maximum likelihood detector, there are four ways that the trellis diagram can branch from one sampling time to the next, respectively called "Case 0", "Case 1", "Case 2", and "Case 3".

Next, in step 305, the metric coefficients of the difference metrics are derived, employing the "cases" of FIG. 5. One of skill in the art will understand that the derivation may employ various approaches, such as logarithms, and may incorporate techniques which reduce the complexity of the metrics. It is these metric coefficients that are employed in steps 306 and 307, where the sample outputs for the expected waveforms, for example, of a particular media, are determined, and the metric coefficient numerical values are calculated for the expected sample outputs.

The equations for deriving the metric coefficients minimize the mean squared error between the received signal and the ideal signal, which is the noise-free signal.

In steps 306 and 307, the sample outputs of the expected waveforms are determined, for example, by measuring a number of sample outputs for the waveforms, and calculating the mean values of each of the sample points, and the metric coefficient numerical values are calculated for the mean values of the sample outputs, thereby providing the numerical metric coefficients 309.

Thus, in the process of steps 300–309 of FIG. 20, the metric coefficients are derived from the difference between metrics directly associating "0" and "1" states of the recorded signal, and the numerical metric coefficients are calculated for programming the programmable inputs.

Figure 21:
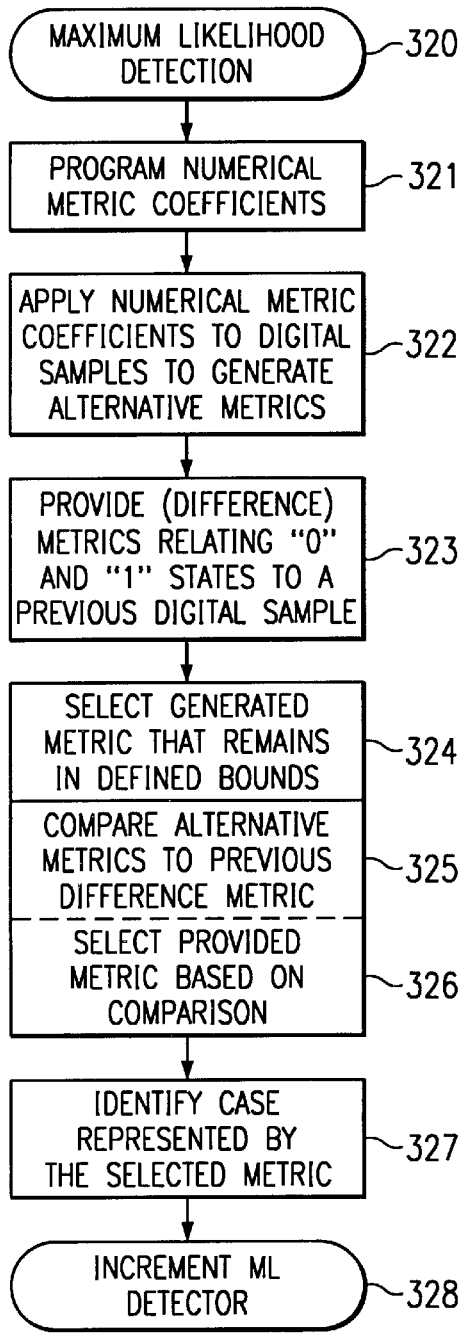
FIG. 21 is a flow chart depicting the methodology for maximum likelihood detection in accordance with the present invention.

FIG. 21 illustrates in a flow chart the methodology for maximum likelihood detection in accordance with the present invention, beginning at step 320. Step 321 comprises programming the at least two numerical metric coefficients relating to the probability of the digital samples comprising a data sequence that were defined in the process of FIG. 20.

In step 322, the programmed metric coefficients are respectively applied to each digital sample of channel output signals "y" supplied at an input. The application of the metric coefficients provides alternative metrics thereof at at least two respective outputs, as discussed above.

Also as discussed above, in prior maximum likelihood detectors, the alternative metrics are each accumulated to a prior metric, the most likely accumulated metric is selected, and the next alternative metrics are accumulated to the accumulated metric. The accumulation is accomplished in registers, and tends to grow without bound, so that, at some point, the capacity of the accumulation registers can be exceeded, resulting in overflow. In order to prevent overflow and a resultant discontinuity in the data, the registers are often normalized and the maximum likelihood detector adjusted to the normalized accumulation registers.

In step 323, the programmed metric coefficients, e.g., in FIG. 6, "$g_1$"–"$g_6$" and "$P_1$"–"$P_6$", derived from the above are respectively applied by logic to each digital input sample "y". The resultant outputs are stored and are further processed and selectively combined with a previous metric in accordance with the above "case" equations. Thus, step 323 comprises providing the difference metrics, representing the respective cases, e.g., of FIG. 5, the metric on line 481 of FIG. 7 representing case "0", on input 466 representing case "1", on input 480 representing case "2", and on input 468 representing case "3". As the result, the provided metrics are related to the alternative metrics and to the previous metric 68.

Use of the difference metrics and resultant difference metric coefficients allows, in step 324, a selector 60 of FIG. 7 to select as the difference metric "$DJ_k$" 63 from between the calculated metrics of inputs 468, 480, 481 or 466 of multiplexor 64.

The selection of step 324, by selecting one of the provided difference metrics of inputs 468, 480, 481 and 466, insures that the resultant metric on output 63 remains in defined bounds. The cases designated on lines 61 and 62 are generated, in substep 325 by comparing the alternative metrics on inputs 54 and 55 to the previous difference metric.

In substep 326, the states on outputs 61 and 62 are used to select the next difference metric "$DJ_k$" 63, and are used in step 327 to select a trellis path in path memory 80 to a maximum likelihood state dictated by the identified finite state. The path memory 80 will provide the appropriate data bit at output 81.

The use, in accordance with the present invention, of a difference metric "$DJ_k$" 63 employs only a single metric selection, as opposed to the prior methods.

Figure 9:
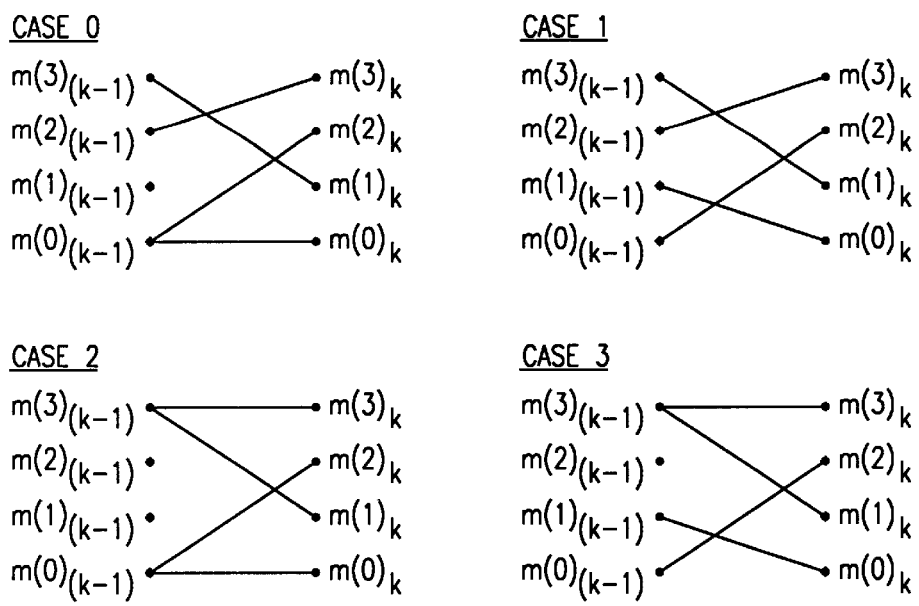
FIG. 9 is a diagram of an example of a maximum likelihood trellis branching from one sample to the next for second order detection.

FIG. 9 illustrates the possible maximum likelihood trellis branching for second order digital samples of data recorded as analog signals 32 or 33 of FIGS. 3B and 4B, having three finite states, or for second order detection of a signal of the form of signal 31 of FIGS. 3A and 4A, where the respective samples of the signal are very unequal, requiring substantially different metrics. In the example of FIG. 9, each point selected for Cases "0", "1", "2" and "3" is determined for a particular media for a particular head by determining the mean value "m" for each point. As above, the equations are solved to determine particular metric coefficients.

Second order maximum likelihood detection involves more complicated equations, but the process of determining the metric coefficients 300 of FIG. 20 is the same. In a linear second order maximum likelihood detection system, the overall channel function is $F(D)=f_0+f_1D+f_2D^2$. With this channel function, in the absence of noise and at sample time k, the output sequence is $\{y_k\}=f_0a_k+f_1a_{k-1}+f_2a_{k-2}$. Thus, in step 301, for a binary input $a_k\epsilon\{a_0, a_1\}$, where $a_0$ represents a binary 0 and $a_1$ represents a binary 1:

$$Y_k\epsilon\{a_0f_0+a_0f_1+a_0f_2=\mu_0,\ a_0f_0+a_0f_1+a_1f_2=\mu_1,\ a_1f_0+a_1f_1+a_1f_2=\mu_3,\ a_1f_0+a_0f_1+a_0f_2=\mu_4,\ a_1f_0+a_1f_1+a_0f_2=\mu_6,\ a_1f_0+a_1f_1+a_1f_2=\mu_7\}$$

Because of the (1,k) NRZI code constraints, two of the eight possible values for $y_k$ have been eliminated. Alternatively, for non-linear systems, the resultant mean value ($\mu_x$) can be measured from the actual system response.

For this system, at any time k, there are four metrics:

$$m(0)_k = \text{maximum}\ m(0)_{k-1} + \ln[p(y_k|s_k = 0; a_0)]$$
$$m(1)_{k-1} + \ln[p(y_k|s_k = 1; a_0)]$$
$$m(1)_k = m(3)_{k-1} + \ln[p(y_k|s_k = 3; a_0)]$$
$$m(2)_k = m(0)_{k-1} + \ln[p(y_k|s_k = 0; a_1)]$$
$$m(3)_k = \text{maximum}\ m(2)_{k-1} + \ln[p(y_k|s_k = 2; a_1)]$$
$$m(3)_{k-1} + \ln[p(y_k|s_k = 3; a_1)]$$

Where $s_k = 0$ if $a_{k-1} = a_0$ and $a_{k-2} = a_0$
  1 if $a_{k-1} = a_0$ and $a_{k-2} = a_1$
  2 if $a_{k-1} = a_1$ and $a_{k-2} = a_0$
  3 if $a_{k-1} = a_1$ and $a_{k-2} = a_1$ It is important to note that $m(1)_k$ and $m(2)_k$ are functions of only one previous metric. This fact can be used to reduce the hardware complexity and improve the detector performance.

$$\ln[p(y_k|s_k=0;a_0)]=-((y_k-\mu_0)^2/2\ \delta^2)-(1/2)\ln[2\ \pi\delta^2]$$
$$\ln[p(y_k|s_k=1;a_0)]=-((y_k-\mu_1)^2/2\ \delta^2)-(1/2)\ln[2\ \pi\delta^2]$$
$$\ln[p(y_k|s_k=3;a_0)]=-((y_k-\mu_3)^2/2\ \delta^2)-(1/2)\ln[2\ \pi\delta^2]$$
$$\ln[p(y_k|s_k=0;a_1)]=-((y_k-\mu_4)^2/2\ \delta^2)-(1/2)\ln[2\ \pi\delta^2]$$
$$\ln[p(y_k|s_k=2;a_1)]=-((y_k-\mu_6)^2/2\ \delta^2)-(1/2)\ln[2\ \pi\delta^2]$$
$$\ln[p(y_k|s_k=3;a_1)]=-((y_k-\mu_7)^2/2\ \delta^2)-(1/2)\ln[2\ \pi\delta^2]$$

After the removal of the constant terms, the metric equations become:

$$m(0)_k=\text{maximum}\ \{m(0)_{k-1}+2\mu_0y_k-\mu_0^2;m(1)_{k-1}+2\mu_1y_k-\mu_1^2\}$$
$$m(1)_k=m(3)_{k-1}+2\mu_3y_k-\mu_3^2$$
$$m(2)_k=m(0)_{k-1}+2\mu_4y_k-\mu_4^2$$
$$m(3)_k=\text{maximum}\ \{m(2)_{k-1}+2\mu_6y_k-\mu_6^2;m(3)_{k-1}+2\mu_7y_k-\mu_7^2\}$$

As shown in FIG. 9, for a second order (1,k) constrained maximum likelihood detector, there are four ways that the trellis diagram can branch from one sampling time to the next. For unconstrained second order maximum likelihood detection, there are 16 possible ways that the trellis can branch. By integrating the modulation code constraints into the detector, the number of branches is reduced to the four illustrated branches.

Once again, as described above, the metrics are difficult to implement in that there are no bounds on the size of the metrics, and they must be normalized in order for them to work with limited capacity registers.

In accordance with the present invention, by employing difference metrics, the size of the metric register is constrained within known bounds. Thus, in steps 303 and 305, the metric coefficients of the difference metrics are derived, employing the "cases" of FIG. 9. As above, it is these metric coefficients that are employed in steps 306 and 307, where the sample outputs for the expected waveforms, for example, of a particular media, are determined, and the metric coefficient numerical values are calculated for the expected sample outputs.

Thus, employing difference metrics:
1. For Case 0 to have occurred;
Thus, in step 303:
1. For Case 0 to have occurred:

$$m(0)_{k-1}+2\mu_0 y_k-\mu_0^2>m(1)_{k-1}+2\mu_1 y_k-\mu_1^2$$

$$m(2)_{k-1}+2\mu_6 y_k-\mu_6^2>m(3)_{k-1}+2\mu_7 y_k-\mu_7^2$$

Defining:

$$DJ(a,b)_k=m(a)_k-m(b)_k$$

if $$DJ(1,0)_{k-1}<2(\mu_o-\mu_1)y_k-\mu_0^2+\mu_1^2$$

and $$DJ(3,2)_{k-1}<2(\mu_6-\mu_7)y_k-\mu_6^2+\mu_7^2$$

then Case 0 has occurred and:

$$DJ(1,0)_k=DJ(3,0)_{k-1}+2(\mu_3-\mu_0)y_k-\mu_3^2+\mu_0^2$$

$$DJ(2,0)_k=2(\mu_4-\mu_0)y_k-\mu_4^2+\mu_0^2$$

$$DJ(3,0)_k=DJ(2,0)_{k-1}+2(\mu_6-\mu_0)y_k-\mu_6^2+\mu_0^2$$

$$DJ(2,1)_k=-DJ(3,0)_{k-1}+2(\mu_4-\mu_3)y_k-\mu_4^2+\mu_3^2$$

$$DJ(3,1)_k=-DJ(3,2)_{k-1}+2(\mu_6-\mu_3)y_k-\mu_6^2+\mu_3^2$$

$$DJ(3,2)_k=DJ(2,0)_{k-1}+2(\mu_6-\mu_4)y_k-\mu_6^2+\mu_4^2$$

2. If $$DJ(1,0)_{k-1}>2(\mu_o-\mu_1)y_k-\mu_0^2+\mu_1^2$$

and $$DJ(3,2)_{k-1}<2(\mu_6-\mu_7)y_k-\mu_6^2+\mu_7^2$$

then Case 1 has occurred and:

$$DJ(1,0)_k=DJ(3,1)_{k-1}+2(\mu_3-\mu_1)y_k-\mu_3^2+\mu_1^2$$

$$DJ(2,0)_k=-DJ(1,0)_{k-1}+2(\mu_4-\mu_1)y_k-\mu_4^2+\mu_1^2$$

$$DJ(3,0)_k=DJ(2,1)_{k-1}+2(\mu_6-\mu_1)y_k-\mu_6^2+\mu_1^2$$

$$DJ(2,1)_k=-DJ(3,0)_{k-1}+2(\mu_4-\mu_3)y_k-\mu_4^2+\mu_3^2$$

$$DJ(3,1)_k=-DJ(3,2)_{k-1}+2(\mu_6-\mu_3)y_k-\mu_6^2+\mu_3^2$$

$$DJ(3,2)_k=DJ(2,0)_{k-1}+2(\mu_6-\mu_4)y_k-\mu_6^2+\mu_4^2$$

3. If $$DJ(1,0)_{k-1}<2(\mu_o-\mu_1)y_k-\mu_0^2+\mu_1^2$$

and $$DJ(3,2)_{k-1}>2(\mu_6-\mu_7)y_k-\mu_6^2+\mu_7^2$$

then Case 2 has occurred and:

$$DJ(1,0)_k=DJ(3,0)_{k-1}+2(\mu_3-\mu_0)y_k-\mu_3^2+\mu_0^2$$

$$DJ(2,0)_k=2(\mu_4-\mu_0)y_k-\mu_4^2+\mu_0^2$$

$$DJ(3,0)_k=DJ(3,0)_{k-1}+2(\mu_7-\mu_0)y_k-\mu_7^2+\mu_0^2$$

$$DJ(2,1)_k=-DJ(3,0)_{k-1}+2(\mu_4-\mu_3)y_k-\mu_4^2+\mu_3^2$$

$$DJ(3,1)_k=2(\mu_7-\mu_3)y_k-\mu_7^2+\mu_3^2$$

$$DJ(3,2)_k=DJ(3,0)_{k-1}+2(\mu_7-\mu_4)y_k-\mu_7^2+\mu_4^2$$

4. If $$DJ(1,0)_{k-1}>2(\mu_o-\mu_1)y_k-\mu_0^2+\mu_1^2$$

and $$DJ(3,2)_{k-1}>2(\mu_6-\mu_7)y_k-\mu_6^2+\mu_7^2$$

then Case 3 has occurred and:

$$DJ(1,0)_k=DJ(3,1)_{k-1}+2(\mu_3-\mu_1)y_k-\mu_3^2+\mu_1^2$$

$$DJ(2,0)_k=-DJ(1,0)_{k-1}+2(\mu_4-\mu_1)y_k-\mu_4^2+\mu_1^2$$

$$DJ(3,0)_k=DJ(3,1)_{k-1}+2(\mu_7-\mu_1)y_k-\mu_7^2+\mu_1^2$$

$$DJ(2,1)_k=-DJ(3,0)_{k-1}+2(\mu_4-\mu_3)y_k-\mu_4^2+\mu_3^2$$

$$DJ(3,1)_k=2(\mu_7-\mu_3)y_k-\mu_7^2+\mu_3^2$$

$$DJ(3,2)_k=DJ(3,0)_{k-1}+2(\mu_7-\mu_4)y_k-\mu_7^2+\mu_4^2$$

BV utilizing the fact that each difference metric can be expressed as the sum of two other difference metrics ($DJ(a,c)_k+DJ(b,c)_k$) it is possible to reduce the number of difference metrics to three. If the number of difference metrics is reduced to four, then each difference metric calculation requires no more than two difference metrics be summed together. This method provides greater parallelism and enhances the speed at which hardware can operate.

1. Equations based on $DJ(1,0)_k$:
   if $$DJ(1,0)_{k-1}<2(\mu_o-\mu_1)y_k-\mu_0^2+\mu_1^2$$

then $$DJ(1,0)_k=DJ(3,2)_{k-1}+DJ(2,0)_{k-1}+2(\mu_3-\mu_0)y_k-\mu_3^2+\mu_0^2$$

$$DJ(2,0)_k=2(\mu_4-\mu_0)y_k-\mu_4^2+\mu_0^2$$

else $$DJ(1,0)_k=DJ(3,1)_{k-1}+2(\mu_3-\mu_1)y_k-\mu_3^2+\mu_1^2$$

$$DJ(2,0)_k=-DJ(1,0)_{k-1}+2(\mu_4-\mu_1)y_k-\mu_4^2+\mu_1^2$$

2. Equations based on $DJ(3,2)_k$:
   if $$DJ(3,2)_{k-1}<2(\mu_6-\mu_7)y_k-\mu_6^2+\mu_7^2$$

then $$DJ(3,1)_k=-DJ(3,2)_{k-1}+2(\mu_6-\mu_3)y_k-\mu_6^2+\mu_3^2$$

$$DJ(3,2)_k = DJ(2,0)_{k-1} + 2(\mu_6 - \mu_4)y_k - \mu_6^2 + \mu_4^2$$

else $$DJ(3,1)_k = 2(\mu_7 - \mu_3)y_k - \mu_7^2 + \mu_3^2$$

$$DJ(3,2)_k = DJ(3,1)_{k-1} + DJ(1,0)_{k-1} + 2(\mu_7 - \mu_4)y_k - \mu_7^2 + \mu_4^2$$

Defining:

$$g_1 = 2(\mu_0 - \mu_1) \text{ and } P_1 = -\mu_0^2 + \mu_1^2,$$

$$g_2 = 2(\mu_6 - \mu_7) \text{ and } P_2 = -\mu_6^2 + \mu_7^2,$$

$$g_3 = 2(\mu_3 - \mu_0) \text{ and } P_3 = -\mu_3^2 + \mu_0^2,$$

$$g_4 = 2(\mu_4 - \mu_0) \text{ and } P_4 = -\mu_4^2 + \mu_0^2,$$

$$g_5 = 2(\mu_3 - \mu_1) \text{ and } P_5 = -\mu_3^2 + \mu_1^2,$$

$$g_6 = 2(\mu_4 - \mu_1) \text{ and } P_6 = -\mu_4^2 + \mu_1^2,$$

$$g_7 = 2(\mu_6 - \mu_3) \text{ and } P_7 = -\mu_6^2 + \mu_3^2,$$

$$g_8 = 2(\mu_6 - \mu_4) \text{ and } P_8 = -\mu_6^2 + \mu_4^2,$$

$$g_9 = 2(\mu_7 - \mu_3) \text{ and } P_9 = -\mu_7^2 + \mu_3^2,$$

$$g_{10} = 2(\mu_7 - \mu_4) \text{ and } P_{10} = -\mu_7^2 + \mu_4^2;$$

Then,
1. Equations based on $DJ(1,0)_k$:
if $$DJ(1,0)_{k-1} < g_1 y_k + P_1$$

then $$DJ(1,0)_k = DJ(3,2)_{k-1} + DJ(2,0)_{k-1} + g_3 y_k + P_3$$

$$DJ(2,0)_k = g_4 y_k + P_4$$

else $$DJ(1,0)_k = DJ(3,1)_{k-1} + g_5 y_k + P_5$$

$$DJ(2,0)_k = -DJ(1,0)_{k-1} + g_6 y_k + P_6$$

2. Equations based on $DJ(3,2)_k$:
if $$DJ(3,2)_{k-1} < g_2 y_k + P_2$$

then $$DJ(3,1)_k = -DJ(3,2)_{k-1} + g_7 y_k + P_7$$

$$DJ(3,2)_k = DJ(2,0)_{k-1} + g_8 y_k + P_8$$

else $$DJ(3,1)_k = g_9 y_k + P_9$$

$$DJ(3,2)_k = DJ(3,1)_{k-1} + DJ(1,0)_{k-1} + g_{10} y_k + P_{10}$$

Again, one of skill in the art will recognize that alternative approaches may be utilized to derive the difference metrics.

As above, in steps 306 and 307, the sample outputs of the expected waveforms are determined, for example, by measuring a number of sample outputs for the waveforms, and calculating the mean values of each of the sample points, and the metric coefficient numerical values are calculated for the mean values of the sample outputs, thereby providing the numerical metric coefficients 309.

Referring to FIG. 6, the programmed metric coefficients are applied to each digital sample of channel output signals "y", to generate the alternative metrics and the inputs to the difference metrics so that the difference metrics representing the 4 cases of FIG. 9 may be calculated.

Figure 10:
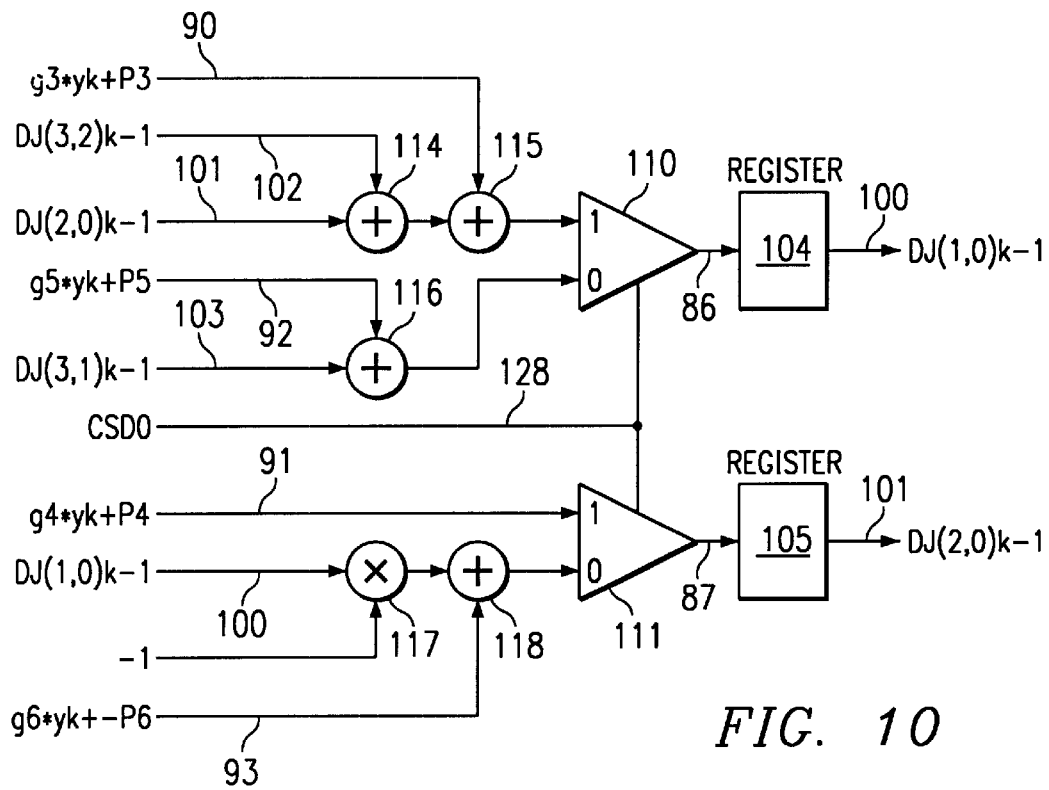
Figure 11:
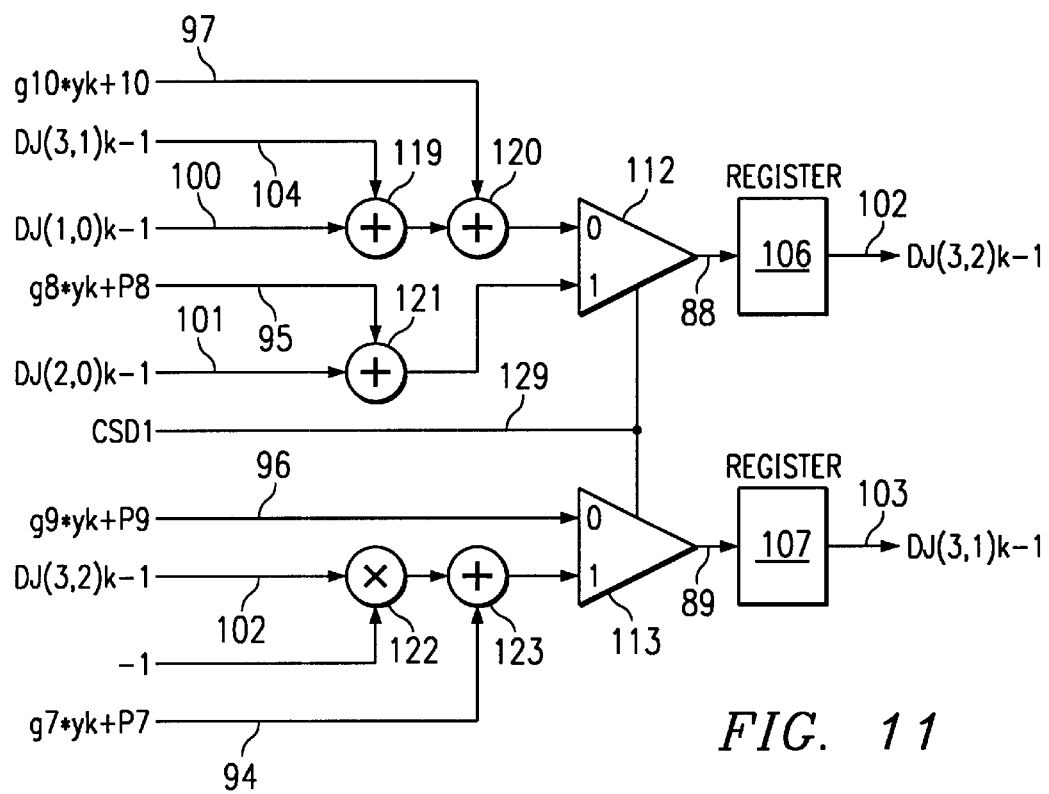

FIGS. 10 and 11 illustrate an embodiment of the present invention for calculating the difference metric values, using a second order detection, for example, of a signal of the form of signal 33 of FIGS. 3B and 4B, or, with alternative programmed inputs, of a signal of the form of signal 35 of FIGS. 3C and 4C, where the respective samples of the signal are very unequal, as discussed above. The logic of FIGS. 10 and 11 provides 4 selected second order difference metrics at outputs 86–89 by combining the inputs 90–97 from the outputs 465–468 of FIG. 6, combined with previous second order difference metrics at outputs 100–103 from registers 104–107. The inputs are combined by logic 114–122 in accordance with the above equations to provide the various difference metrics.

Figure 13:
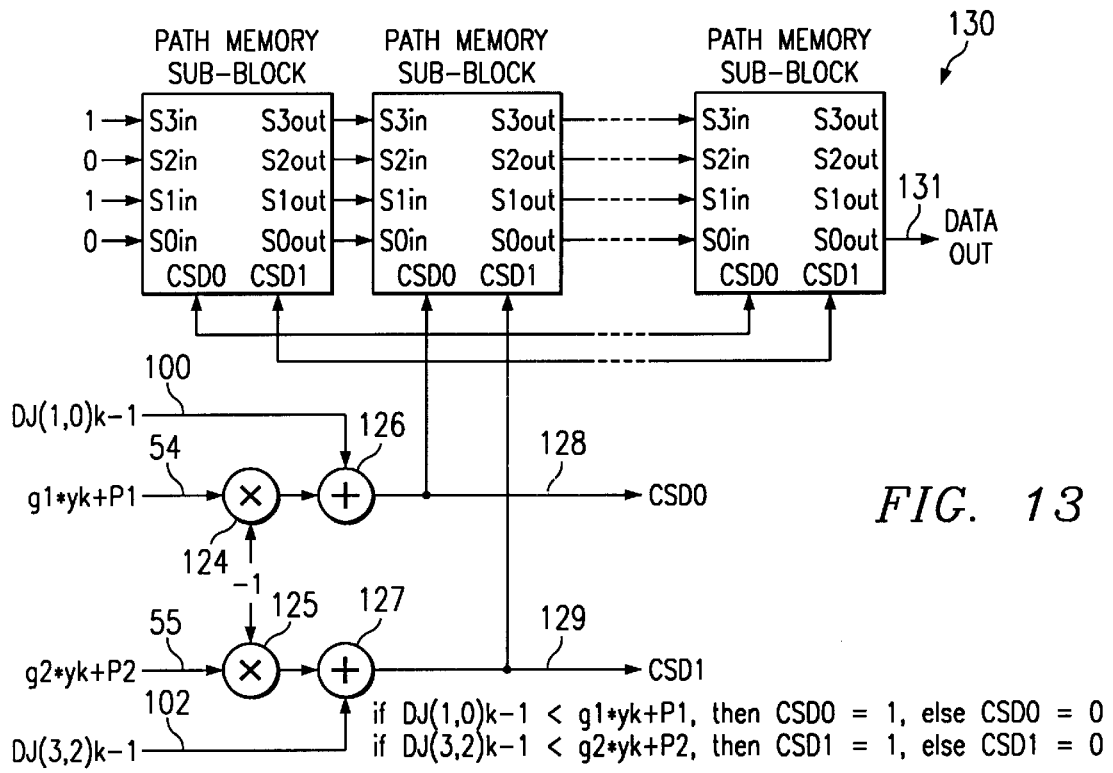

The selection is under the control of the logic of FIG. 13 by comparison logic 124–127, where the alternative metrics at outputs 54 and 55 of FIG. 6 are compared to selected second order previous difference metrics $DJ(1,0)_{(k-1)}$ 100 and $DJ(3,2)_{(k-1)}$ 102 of FIG. 10. The alternative metrics are respectively compared with the selected previous difference metrics in logic 124–127 to provide the respective CSD0 and CSD1 outputs 128 and 129. The state of the outputs 128 and 129 again provide the selection codes to select the difference metrics at multiplexors 110–113 in FIGS. 10 and 11. As described above, the selected difference metrics remain within defined bounds in accordance with the present invention, and are not continuously accumulated without bounds.

Figure 12:
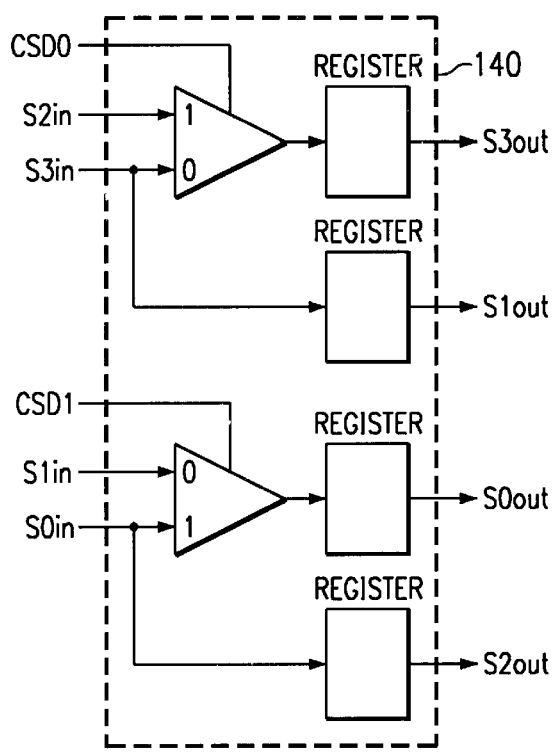
FIGS. 10–13 are a block diagrams of logic for providing selected second order difference metrics from the metrics of the circuit of FIG. 6, and selecting the maximum likelihood branch which minimizes the mean squared error with respect to the previous finite maximum likelihood state in accordance with the present invention.

The comparisons by the logic 124–127 provide the respective positive and negative states on outputs 128 and 129 which identify the one of the finite number of states represented by the selected accumulated metric, and are used to set a maximum likelihood path memory 130 to a maximum likelihood state dictated by the identified finite state. The maximum likelihood elements path memory comprises a plurality of identical sub-blocks which are depicted in FIG. 12 as sub-block 140. The path memory 130 provides the appropriate data bit at output 131.

An embodiment of a third order maximum likelihood detector is described with reference to FIGS. 13–19. Referring to the signals of FIGS. 3D and 4D, the channel sample $y_k$ is the function of the four input bits $a_k$, $a_{k-1}$, $a_{k-2}$, and $a_{k-3}$. As discussed above, the goal of the maximum likelihood detector is to produce an accurate estimate of the channel input sequence $\{a_k\}$ by observing the pulse amplitude modulated sequence $\{y_k\}$. The maximum likelihood detector does this by maximizing the likelihood function through the power of recursive nature of the Viterbi decoder, with the log of the likelihood function accumulated into metrics at each sample time k.

In the (1, 7) third order decoder, there are 6 possible states and metrics. There are two states that are not valid modulation code outputs which can be eliminated. Thus, with ak representing the current bit and sk representing the preceding state:

$$m(0)_k = \text{maximum } m(0)_{k-1} + \ln[p(y_k|s_k = 0; a_k = 0)]$$
$$m(1)_{k-1} + \ln[p(y_k|s_k = 1; a_k = 0)]$$
$$m(1)_k = m(3)_{k-1} + \ln[p(y_k|s_k = 3; a_k = 0)]$$

-continued $$m(3)_k = \text{maximum } m(6)_{k-1} + \ln[p(y_k|s_k = 6; a_k = 0)]$$
$$m(7)_{k-1} + \ln[p(y_k|s_k = 7; a_k = 0)]$$
$$m(4)_k = \text{maximum } m(0)_{k-1} + \ln[p(y_k|s_k = 0; a_k = 1)]$$
$$m(1)_{k-1} + \ln[p(y_k|s_k = 1; a_k = 1)]$$
$$m(6)_k = m(4)_{k-1} + \ln[p(y_k|s_k = 4; a_k = 1)]$$
$$m(7)_k = \text{maximum } m(6)_{k-1} + \ln[p(y_k|s_k = 6; a_k = 1)]$$
$$m(7)_{k-1} + \ln[p(y_k|s_k = 7; a_k = 1)].$$

Also, because of the modulation code, the metrics at states 1 and 6 can select only one previous metric.

Thus, for the generalized 3rd order Viterbi decoder, where the channel signal $\{y_k\}$ contains an ideal signal perturbed by zero mean additive white gaussian noise of variance $\delta^2$, then: $y_k = f(a_k, a_{k-1}, a_{k-2}, a_{k-3})$ and $s_k = 4a_{k-1} + 2a_{k-2} + a_{k-3}$, and (the notation is switched to separately represent the 0 and 1 in view of the complexity of the equations), $$\ln[p(y_k|s_k=0;a_k=0)] = -((y_k-\mu_{0/0})^2/2\ \delta^2) - (1/2)\ln[2\ \pi\delta^2]$$
$$\ln[p(y_k|s_k=1;a_k=0)] = -((y_k-\mu_{1/0})^2/2\ \delta^2) - (1/2)\ln[2\ \pi\delta^2]$$
$$\ln[p(y_k|s_k=3;a_k=0)] = -((y_k-\mu_{3/0})^2/2\ \delta^2) - (1/2)\ln[2\ \pi\delta^2]$$
$$\ln[p(y_k|s_k=4;a_k=0)] = -((y_k-\mu_{4/0})^2/2\ \delta^2) - (1/2)\ln[2\ \pi\delta^2]$$
$$\ln[p(y_k|s_k=6;a_k=0)] = -((y_k-\mu_{6/0})^2/2\ \delta^2) - (1/2)\ln[2\ \pi\delta^2]$$
$$\ln[p(y_k|s_k=7;a_k=0)] = -((y_k-\mu_{7/0})^2/2\ \delta^2) - (1/2)\ln[2\ \pi\delta^2]$$
$$\ln[p(y_k|s_k=0;a_k=1)] = -((y_k-\mu_{0/1})^2/2\ \delta^2) - (1/2)\ln[2\ \pi\delta^2]$$
$$\ln[p(y_k|s_k=1;a_k=1)] = -((y_k-\mu_{1/1})^2/2\ \delta^2) - (1/2)\ln[2\ \pi\delta^2]$$
$$\ln[p(y_k|s_k=3;a_k=1)] = -((y_k-\mu_{3/1})^2/2\ \delta^2) - (1/2)\ln[2\ \pi\delta^2]$$
$$\ln[p(y_k|s_k=4;a_k=1)] = -((y_k-\mu_{4/1})^2/2\ \delta^2) - (1/2)\ln[2\ \pi\delta^2]$$
$$\ln[p(y_k|s_k=6;a_k=1)] = -((y_k-\mu_{6/1})^2/2\ \delta^2) - (1/2)\ln[2\ \pi\delta^2]$$
$$\ln[p(y_k|s_k=7;a_k=1)] = -((y_k-\mu_{7/1})^2/2\ \delta^2) - (1/2)\ln[2\ \pi\delta^2]$$

The calculations of steps 300–309 of FIG. 20 are similar to the above, as is understood by those of skill in the art, and results in six possible states and metrics, respectively (after substitution of log probabilities with elimination of all common terms into the metrics) giving the following equations:

$$m(0)_k = \text{maximum }\{m(0)_{k-1} + 2\mu_{0/0}y_k - \mu_{0/0}^2;\ m(1)_{k-1} + 2\mu_{1/0}y_k - \mu_{1/0}^2\}$$
$$m(1)_k = m(3)_{k-1} + 2\mu_{3/0}y_k - \mu_{3/0}^2$$
$$m(3)_k = \text{maximum }\{m(6)_{k-1} + 2\mu_{6/0}y_k - \mu_{6/0}^2;\ m(7)_{k-1} + 2\mu_{7/0}y_k - \mu_{7/0}^2\}$$
$$m(4)_k = \text{maximum }\{m(0)_{k-1} + 2\mu_{0/1}y_k - \mu_{0/1}^2;\ m(1)_{k-1} + 2\mu_{1/1}y_k - \mu_{1/1}^2\}$$
$$m(6)_k = m(4)_{k-1} + 2\mu_{4/1}y_k - \mu_{4/1}^2$$
$$m(7)_k = \text{maximum }\{m(6)_{k-1} + 2\mu_{6/1}y_k - \mu_{6/1}^2; m(7)_{k-1} + 2\mu_{7/1}y_k - \mu_{7/1}^2\}.$$

Since there are only six possible sates and metrics, and, because of the 1, 7 modulation code, the metrics at states 2 and 6 can select only one previous metric, the reduction of states and metric branching due to the modulation code make the difference metric reductions far simpler, resulting in six difference metrics rather than the fifteen possible difference metrics. The derivation and reduction of the difference metrics, based on the above, is understood by those of skill in the art and will not be repeated here. Various approaches may be made in the reduction process within the context of formulating the appropriate reductions. In one example, Defining:

$$g_1 = 2(\mu_{0/0} - \mu_{1/0}) \text{ and } P_1 = +\mu_{1/0}^2 - \mu_{0/0}^2,$$
$$g_2 = 2(\mu_{6/0} - \mu_{7/0}) \text{ and } P_2 = +\mu_{7/0}^2 - \mu_{6/0}^2,$$
$$g_3 = 2(\mu_{0/1} - \mu_{1/1}) \text{ and } P_3 = +\mu_{1/1}^2 - \mu_{0/1}^2,$$
$$g_4 = 2(\mu_{6/1} - \mu_{7/1}) \text{ and } P_4 = +\mu_{7/1}^2 - \mu_{6/1}^2,$$
$$g_5 = 2(\mu_{3/0} - \mu_{0/0}) \text{ and } P_5 = +\mu_{0/0}^2 - \mu_{3/0}^2,$$
$$g_6 = 2(\mu_{3/0} - \mu_{1/0}) \text{ and } P_6 = +\mu_{1/0}^2 - \mu_{3/0}^2,$$
$$g_7 = 2(\mu_{6/0} - \mu_{3/0}) \text{ and } P_7 = +\mu_{3/0}^2 - \mu_{6/0}^2,$$
$$g_8 = 2(\mu_{4/1} - \mu_{6/0}) \text{ and } P_8 = +\mu_{6/0}^2 - \mu_{4/1}^2,$$
$$g_9 = 2(\mu_{7/0} - \mu_{3/0}) \text{ and } P_9 = +\mu_{3/0}^2 - \mu_{7/0}^2,$$
$$g_{10} = 2(\mu_{4/1} - \mu_{7/0}) \text{ and } P_{10} = +\mu_{7/0}^2 - \mu_{4/1}^2,$$
$$g_{11} = 2(\mu_{4/1} - \mu_{0/1}) \text{ and } P_{11} = +\mu_{0/1}^2 - \mu_{4/1}^2,$$
$$g_{12} = 2(\mu_{0/1} - \mu_{3/0}) \text{ and } P_{12} = +\mu_{3/0}^2 - \mu_{0/1}^2,$$
$$g_{13} = 2(\mu_{4/1} - \mu_{1/1}) \text{ and } P_{13} = +\mu_{1/1}^2 - \mu_{4/1}^2,$$
$$g_{14} = 2(\mu_{1/1} - \mu_{3/0}) \text{ and } P_{14} = +\mu_{3/0}^2 - \mu_{1/1}^2,$$
$$g_{15} = 2(\mu_{6/1} - \mu_{4/1}) \text{ and } P_{15} = +\mu_{4/1}^2 - \mu_{6/1}^2,$$
$$g_{16} = 2(\mu_{7/1} - \mu_{4/1}) \text{ and } P_{16} = +\mu_{4/1}^2 - \mu_{6/1}^2;$$

Then,

1. For State 1:

Equations based on $DJ(1,0)_k$; (CSD0):

if $$DJ(1,0)_{k-1} < g_1 y_k + P_1$$

then $$DJ(1,0)_k = DJ(3,1)_{k-1} + DJ(1,0)_{k-1} + g_5 y_k + P_5$$

else $$DJ(1,0)_k = DJ(3,1)_{k-1} + g_6 y_k + P_6$$

2. For state 3:

Equations based on $DJ(7,6)_k$; (CSD1):

if $$DJ(7,6)_{k-1} < g_2 y_k + P_2$$

then $$DJ(3,1)_k = DJ(6,3)_{k-1} + g_7 y_k + P_7$$
   $$DJ(6,3)_k = -DJ(6,4)_{k-1} + g_8 y_k + P_8$$

else $$DJ(3,1)_k = DJ(7,6)_{k-1} + DJ(6,3)_{k-1} + g_9 y_k + P_9$$
   $$DJ(6,3)_k = -DJ(7,6)_{k-1} - DJ(6,4)_{k-1} + g_{10} y_k + P_{10}$$

3. For State 4:

Equations based on $DJ(1,0)_k$; (CSD2):

if $$DJ(1,0)_{k-1} < g_3 y_k + P_3$$

then $$DJ(6,4)_k = DJ(4,1)_{k-1} + DJ(1,0)_{k-1} + g_{11} y_k + P_{11}$$

$$DJ(4,1)_k = -DJ(3,1)_{k-1} - DJ(1,0)_{k-1} + g_{12} y_k + P_{12}$$

else $$DJ(6,4)_k = DJ(4,1)_{k-1} + g_{13} y_k + P_{13}$$

$$DJ(4,1)_k = -DJ(3,1)_{k-1} + g_{14} y_k + P_{14}$$

4. For state 7:
Equations based on $DJ(7,6)_k$; (CSD3):
if $$DJ(7,6)_{k-1} < g_4 y_k + P_4$$

then $$DJ(7,6)_k = DJ(6,4)_{k-1} + g_{15} y_k + P_{15}$$

else $$DJ(7,6)_k = DJ(7,6)_{k-1} + DJ(6,4)_{k-1} + g_{16} y_k + P_{16};$$

As above, the measurements and calculations are made to determine the numerical values of the programmable metric coefficients.

Using the EPRIV Viterbi decoder, which is a more restricted version of the 3rd order Viterbi decoder, the mean values of the probability functions may be determined through a linear process on the digital function $(1-D)(1+D)^2$.

An example of mean values for calculating the programming inputs for the programmable coefficients is as follows.

For EPRIV, $y_k = h_o a_k + h_1 a_{k-1} + h_2 a_{k-2} + h_3 a_{k-3}$ where $h_o=1$, $h_1=1$, $h_2=-1$, and $h_3=-1$. Thus:

$$\mu_{o/o} = 0$$

$$\mu_{1/o} = h_3 = -1$$

$$\mu_{3/o} = h_2 + h_3 = -2$$

$$\mu_{4/o} = h_1 = 1$$

$$\mu_{6/o} = h_1 + h_2 = 0$$

$$\mu_{7/o} = h_1 + h_2 + h_3 = -1$$

$$\mu_{0/1} = h_0 = 1$$

$$\mu_{1/1} = h_0 + h_3 = 0$$

$$\mu_{3/1} = h_0 + h_2 + h_3 = -1$$

$$\mu_{4/1} = h_0 + h_1 = 2$$

$$\mu_{6/1} = h_0 + h_1 + h_2 = 1$$

$$\mu_{7/1} = h_0 + h_1 + h_2 + h_3 = 0$$

Substitution of the above mean values into the difference metrics gives the following equations:
For State 0:
If $$2y_k + 1 > DJ(1,0)_{k-1}$$

Then $$DJ(1,0)_k = DJ(3,1)_{k-1} + DJ(1,0)_{k-1} - 4y_k - 4$$

Else $$DJ(1,0)_k = DJ(3,1)_{k-1} - 2y_k - 3$$

For State 3:
If $$2y_k + 1 > DJ(7,6)_{k-1}$$

Then $$DJ(3,1)_k = DJ(6,3)_{k-1} + 4y_k + 4$$

$$DJ(6,3)_k = -DJ(6,4)_{k-1} + 4y_k - 4$$

Else $$DJ(3,1)_k = DJ(7,6)_{k-1} + DJ(6,3)_{k-1} + 2y_k + 3$$

$$DJ(6,3)_k = -DJ(7,6)_{k-1} - DJ(6,4)_{k-1} + 6y_k - 3$$

For State 4:
If $$2y_k - 1 > DJ(1,0)_k$$

Then $$DJ(6,4)_k = DJ(4,1)_{k-1} - DJ(1,0)_{k-1} + 2y_k - 3$$

$$DJ(4,1)_k = -DJ(3,1)_{k-1} - DJ(1,0)_{k-1} - 6y_k + 3$$

Else $$DJ(6,4)_k = DJ(4,1)_{k-1} + 4y_k - 4$$

$$DJ(4,1)_k = -DJ(3,1)_{k-1} + 4y_k + 4$$

For State 7:
If $$2y_k - 1 > DJ(7,6)_{k-1}$$

Then $$DJ(7,6)_k = DJ(6,4)_{k-1} - 2y_k + 3$$

Else $$DJ(7,6)_k = DJ(7,6)_{k-1} + DJ(6,4)_{k-1} - 4y_k + 4$$

Thus, referring to FIG. 6, the programmed inputs respectively comprise:

$$g_1=2, P_1=1;$$

$$g_2=2, P_2=1;$$

$$g_3=2, P_3=-1;$$

$$g_4=2, P_4=-1;$$

$$g_5=-4, P_5=-4;$$

$$g_6=-2, P_6=-3;$$

$$g_7=4, P_7=4;$$

$$g_8=4, P_8=-4;$$

$$g_9=2, P_9=3;$$

$$g_{10}=2, P_{10}=-3;$$

$$g_{11}=2, P_{11}=-3;$$

$g_{12}=-6, P_{12}=6;$ $g_{13}=4, P_{13}=-4;$ $g_{14}=4, P_{14}=4;$ $g_{15}=-2, P_{15}=3;$ $g_{16}=-4, P_{16}=4.$

These numerical metric coefficients are then programmed into the respective registers of the logic of FIG. 6. As discussed above, the programmable multiplicative and additive numerical metric coefficients allow the decoder to be adaptable. For example, upon a change of media, the mean of probability functions may vary due to variation of the transfer function of the channel, and other numerical metric coefficients may be selected.

FIGS. 14–17 illustrate an embodiment of the present invention for calculating the difference metric values, using the exemplary third order detection equations, above. For example, the difference metric values are calculated from input samples $y_k$ of a signal of the form of signal 37 of FIGS. 3D and 4D, where the respective samples of the signal are very unequal, as discussed above. The logic of FIGS. 14–17 provide 6 selected third order difference metrics at outputs 221–226 by combining the inputs 235–246 from the outputs 468 of FIG. 6, together with previous third order difference metrics at outputs 251–256 from registers 257–262. The inputs are combined by logic 263–274 in accordance with the above equations to provide the various difference metrics.

Figure 14:
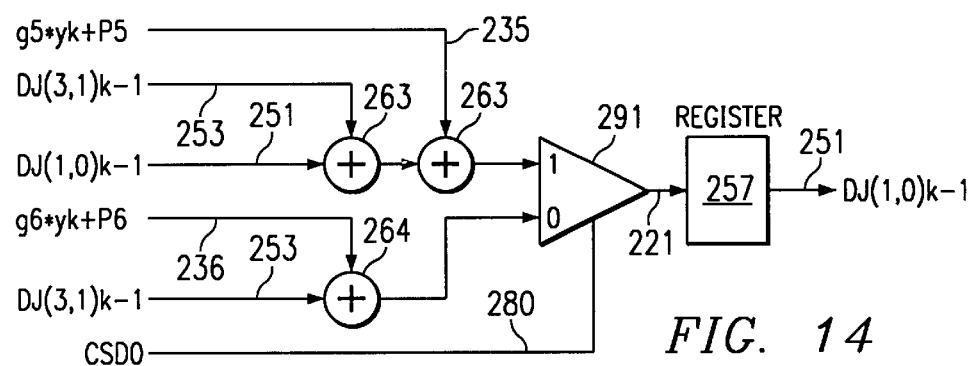
FIGS. 14–19 are a block diagrams of logic for providing selected third order difference metrics from the metrics of the circuit of FIG. 6, and selecting the maximum likelihood branch which minimizes the mean squared error with respect to the previous finite maximum likelihood state in accordance with the present invention.
Figure 15:
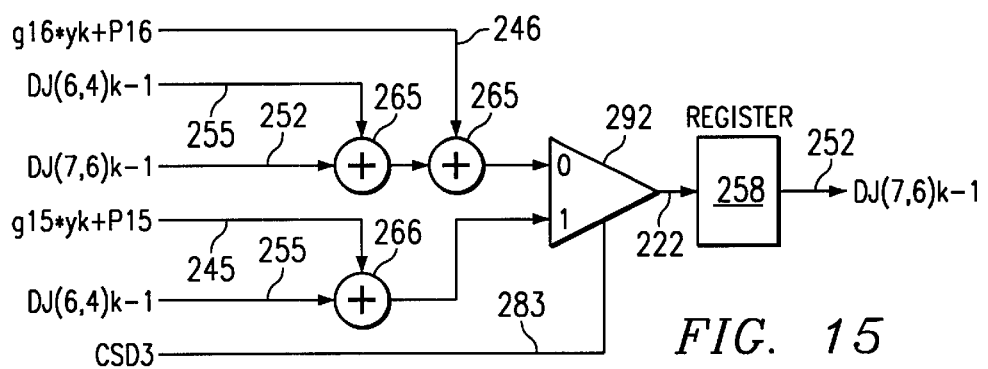
Figure 16:
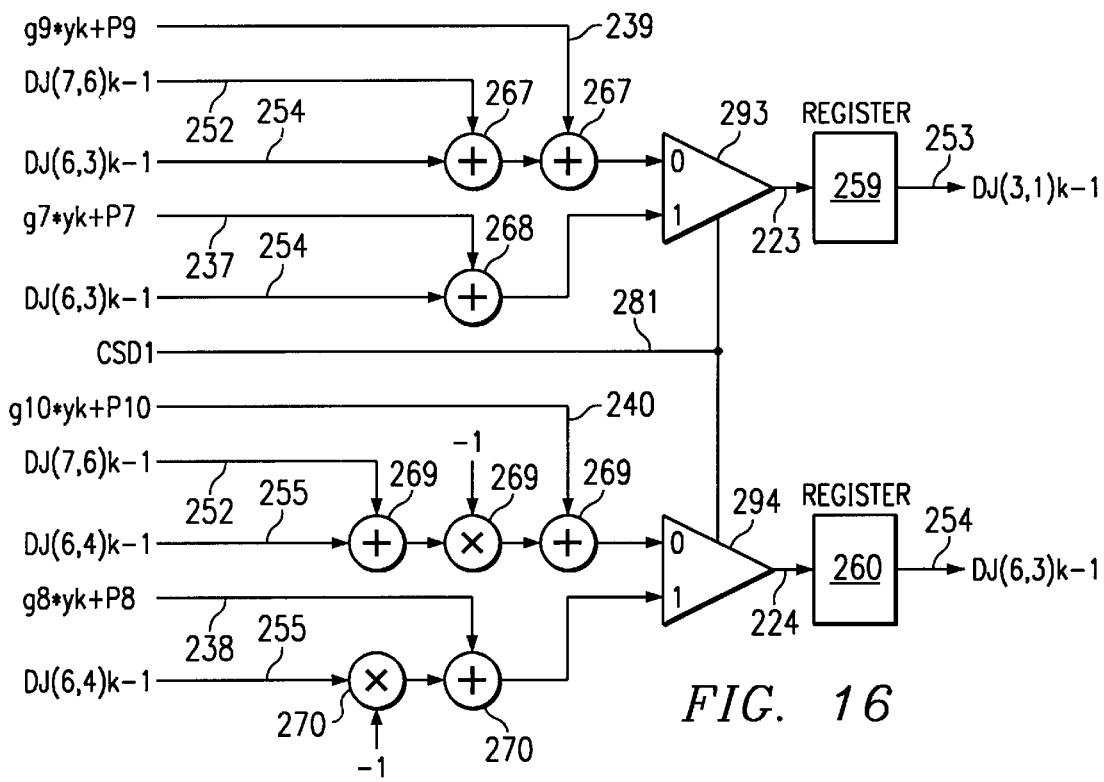
Figure 17:
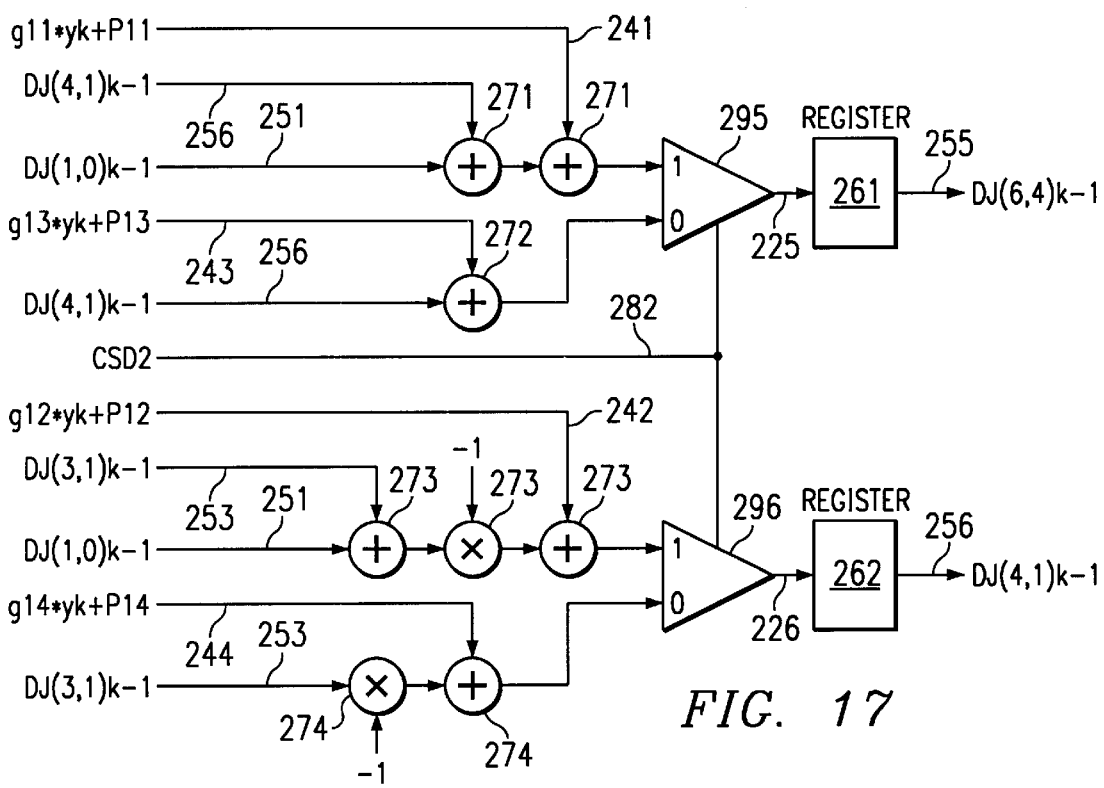
Figure 18:
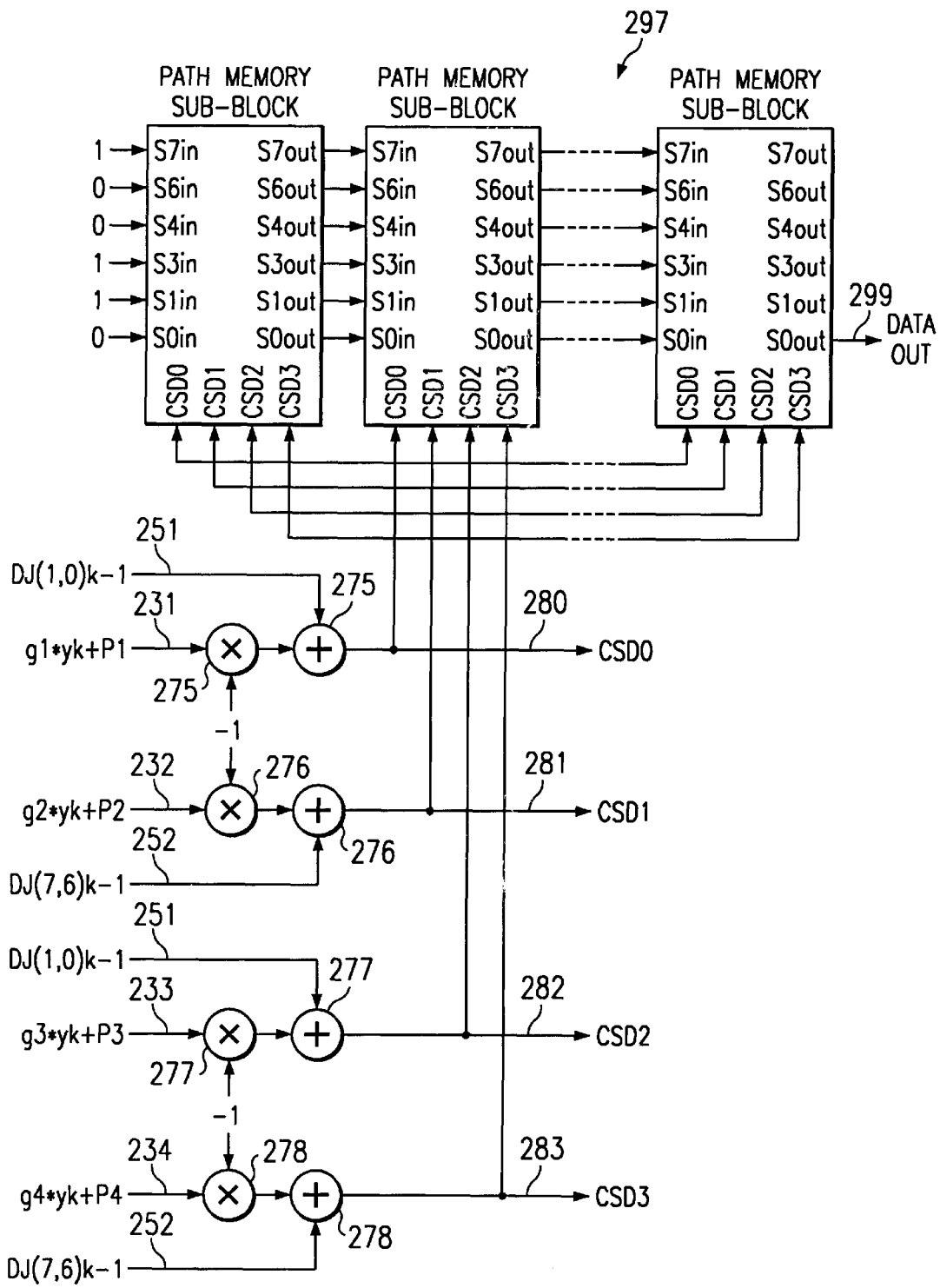

The selection is under the control of the logic of FIG. 18 by comparison logic 275–278, where the alternative metrics, calculated from the programmed metric coefficients and supplied at outputs 54, 55, 465, etc., of FIG. 6, are provided, respectively, at inputs 231, 232, 233, and 234 and compared to selected third order previous difference metrics $DJ(1,0)_{(k-1)}$ 251, and $DJ(7,6)_{(k-1)}$ 252 of FIGS. 14 and 15. The alternative metrics are respectively compared with the selected previous difference metrics in logic 275–278 to provide the respective CSD0, CSD1, CSD2, and CSD3 outputs 280–283. The state of the outputs 280–283 again provide the selection codes to select the difference metrics at multiplexors 291–296 in FIGS. 14–17. As described above, the selected difference metrics remain within defined bounds in accordance with the present invention, and are not continuously accumulated without bounds.

Figure 19:
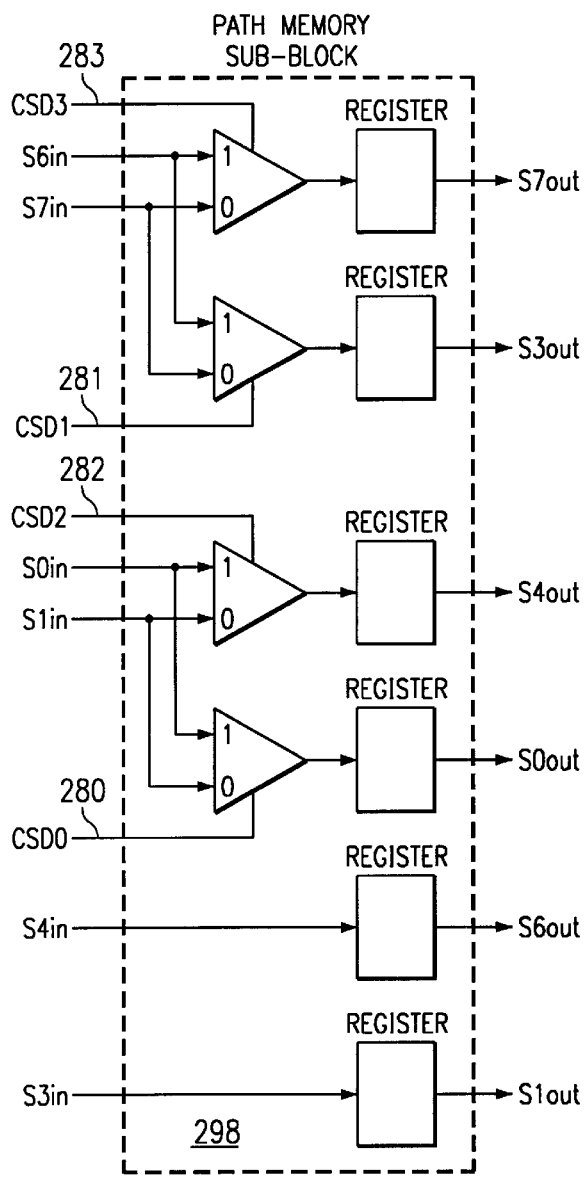

The comparisons by the logic 275–278 of FIG. 18 provide the respective positive and negative states on outputs 280–283 which identify the one of the finite number[ ]of states represented by the selected accumulated metric, and are used to set a maximum likelihood path memory 297 to a maximum likelihood state dictated by the identified finite state. The maximum likelihood elements path memory comprises a plurality of identical sub-blocks which are depicted in FIG. 19 as sub-block 298. The path memory 130 will provide the appropriate data bit at output 299.

Figure 22:
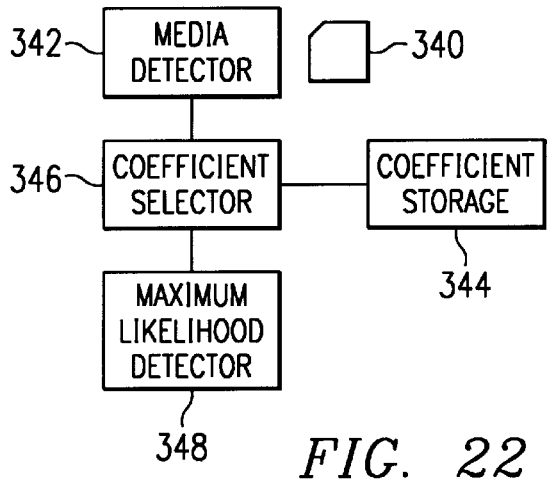
FIG. 22 is a block diagram of an embodiment of the present invention for programming the metric coefficients of the maximum likelihood detector.
Figure 23:
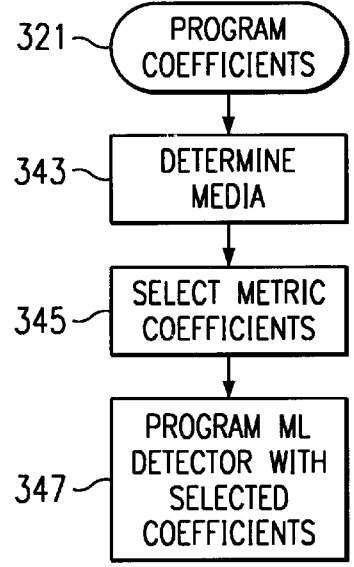
FIG. 23 is a flow chart depicting a method for programming the metric coefficients of the maximum likelihood detector of FIG. 22.

FIGS. 22 and 23 illustrate an embodiment of the present invention for programming the numerical metric coefficients of the maximum likelihood detector for carrying out step 321 of FIG. 21. A removable media 340 to be detected may comprise a label having markings thereon for identifying the media 340, or the first few bytes of the media to be read may have more universal characters which are easily read which identify the media 340. Those of skill in the art may envision further alternative identifiers.

As discussed above, examples of different types of removable media 340 include optical disk and optical tape storage, which may be read-only, write-once, or rewritable media, and may be different types of media, such as molded, magneto-optic and phase-change media, or magnetic tape media, which have media to media variation based on different data densities on the same type of media, different types of media such as chromium-based, nickel-based, ferrous-based media, or between materials used by different manufacturers, or differing thicknesses and therefore differing media to head characteristics over the recording and read head.

A media detector 342 may therefore comprise a well-known optical reader or scanner (of the type used in libraries) or may comprise logic associated with the read channel, and, in step 343, determines the type of media 340. Numerical metric coefficients that have been generated in the process of FIG. 20, may be stored in a lookup table 344 and, in step 345, the numerical metric coefficients are selected by coefficient selector 346. In step 347, the coefficient selector 346 provides the selected numerical metric coefficients to the maximum likelihood detector 348, at the appropriate registers, to program the maximum likelihood detector with the selected numerical metric coefficients.

Thus, the present invention is able to provide maximum likelihood detection of data recorded as analog signals representing a finite number of states, which reduces errors resulting from maximum likelihood detection under differing circumstances, typically as the result of differing media 340. Further, the metric coefficients are derived from the difference between metrics directly associating "0" and "1" states of the recorded signal for maximum likelihood detection, to insure that no accumulation of metrics is unbounded, so that there is never an overflow at the accumulation register.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for maximum likelihood detection of digital samples of data recorded as analog signals representing a finite number of maximum likelihood states in accordance with a finite number of maximum likelihood sample-to-sample path cases, said digital samples representing channel output of said recorded analog signals at a predetermined timing with respect thereto, comprising the steps of:

applying numerical metric coefficients to each of said digital samples to provide at least one difference metric, each said difference metric derived from the difference between metrics directly associating "0" and "1" states of said recorded signal for two sequential said digital samples;

generating a plurality of alternative metrics related to said digital samples;

selecting the one of said respective generated alternative metrics which remains within defined positive and negative bounds by comparing said generated alternative metrics to said difference metric;

identifying the one of said finite number of states represented by said selected metric; and responding to said identified one of said finite states, setting a maximum likelihood state detector to a maximum likelihood state dictated by said identified one of said finite states, said set maximum likelihood state detecting said recorded analog signals.

2. The method of claim 1, wherein said applying step comprises providing a plurality of said difference metrics, and wherein said selecting step additionally comprises selecting one of said plurality of difference metrics, whereby said selected difference metric is selected based on a previous said sequential digital sample for said comparing to said alternative metrics for a following said sequential digital sample.

3. The method of claim 2, wherein said generating step plurality of alternative metrics are derived from metrics directly associating "0" and "1" states of said recorded signal.

4. The method of claim 3, wherein said applying step plurality of difference metrics are derived from equations which minimize the mean squared error between said digital samples and an ideal noise-free signal.

5. The method of claim 3, wherein said applying step plurality of difference metrics and said generating step plurality of alternative metrics and derived from equations representing said associated states of said recorded signal in logarithmic form.

6. The method of claim 3, wherein said selecting step comprises comparing said previous metric to said respective generated alternative metrics, and wherein said identifying step comprises responding to said comparing step to provide encoded identification outputs which identify said one maximum likelihood case.

7. The method of claim 6, wherein said identifying step encoded identification outputs additionally are employed in said selecting step for selecting said one of said plurality of difference metrics.

8. The method of claim 3, for first order maximum likelihood detection of said data recorded as analog signals, said analog signals traversing between four noise-free amplitude values, wherein said finite number of states comprise two finite states.

9. The method of claim 3, for second order maximum likelihood detection of said data recorded as analog signals, said analog signals traversing between six noise-free amplitude values, where said finite number of states comprise four finite states.

10. The method of claim 3, for third order maximum likelihood detection of said data recorded as analog signals, said analog signals traversing between twelve noise-free amplitude values, wherein said finite number of states comprise six finite states, and wherein said applying step said plurality of difference metrics comprise at least four sets of difference metrics.

11. A method for maximum likelihood detection of digital samples of data recorded as analog signals representing a finite number of maximum likelihood states in accordance with a finite number of maximum likelihood sample-to-sample path cases, said digital samples representing channel output of said recorded analog signals at a predetermined timing with respect thereto, comprising the steps of:
programming at least two numerical metric coefficients, said numerical metric coefficients relating to the probability of said digital samples comprising a data sequence;
respectively applying said at least two programmed numerical metric coefficients to each of said digital samples to generate alternative metrics;
providing a previous metric which comprises a difference metric function of a previous digital sample derived from difference metrics representing the difference between metrics directly associating "0" and "1" states of said recorded signal;
selecting the one of said respective generated alternative metrics which minimizes the mean squared error with respect to said previous metric and selecting one of said derived difference metrics, whereby said selected derived difference metric comprises said previous metric for a following said digital sample;
identifying the one of said finite number of maximum likelihood cases represented by said selected metric; and
responding to said identified one of said finite maximum likelihood cases, setting a maximum likelihood path memory to a maximum likelihood state dictated by said identified one of said finite maximum likelihood cases, said set maximum likelihood state detecting said recorded analog signals.

12. The method of claim 11 for first order maximum likelihood detection of said data recorded as analog signals, said analog signals traversing between four noise-free amplitude values, wherein said finite number of states comprise two finite states.

13. The method of claim 11 for second order maximum likelihood detection of said data recorded as analog signals, said analog signals traversing between six noise-free amplitude values, wherein said finite number of states comprise four finite states.

14. The method of claim 11 for third order maximum likelihood detection of said data recorded as analog signals, said analog signals traversing between twelve noise-free amplitude values, wherein said finite number of states comprise six finite states.

15. A maximum likelihood detector for detection of digital samples of data recorded as analog signals representing a finite number of maximum likelihood states in accordance with a finite number of maximum likelihood sample-to-sample cases, said digital samples representing channel output of said recorded analog signals at a predetermined timing with respect thereto, comprising:
a sample input for receiving said digital samples of said recorded analog signals;
sample logic coupled to said sample input, for applying numerical metric coefficients to each of said digital samples to generate a plurality of metrics, at least two of said metrics comprising alternative metrics;
relational logic coupled to said sample logic for providing at least one difference metric, each said difference metric derived from the difference between metrics directly associating "0" and "1" states of said recorded signal for two sequential said digital samples;
a selector coupled to said sample logic and to said relational logic for respectively comparing said alternative metrics to said difference metric, and, based on said comparison, selecting the one of said respective provided alternative metrics which remains within defined positive and negative bounds;
a maximum likelihood path memory coupled to said selector, for identifying the one of said finite number of maximum likelihood cases represented by said selected metric, said path memory responding to said identified one of said finite states to set to a maximum likelihood state dictated by said identified one of said finite states, said set maximum likelihood state detecting said recorded analog signals; and
an output coupled to said maximum likelihood path memory for signaling said set maximum likelihood state.

16. The maximum likelihood detector of claim 15, wherein said relational logic provides a plurality of said difference metrics, and wherein said selector selects one of said plurality of difference metrics based on a previous said sequential digital sample for said comparison to said alternative metrics for a following said sequential digital sample.

17. The maximum likelihood detector of claim 16, wherein said sample logic plurality of alternative metrics are derived from metrics directly associating "0" and "1" states of said recorded signal.

18. The maximum likelihood detector of claim 16, wherein said relational logic plurality of difference metrics are derived from equations which minimize the mean squared error between said digital samples and an ideal noise-free signal.

19. The maximum likelihood detector of claim 16, wherein said sample logic plurality of difference metrics and said relational logic plurality of alternative metrics are derived from equations representing said associated states of said recorded signal in logarithmic form.

20. The maximum likelihood detector of claim 15, wherein said selector provides encoded identification outputs which identify said one maximum likelihood case.

21. The maximum likelihood detector of claim 20, wherein said selector encoded identification outputs additionally are provided to said relational logic for selecting said one of said plurality of difference metrics.

22. The maximum likelihood detector of claim 15, for first order maximum likelihood detection of said data recorded as analog signals, said analog signals traversing between four noise-free amplitude values, wherein said finite number of states comprise two finite states.

23. The maximum likelihood detector of claim 15, for second order maximum likelihood detection of said data recorded as analog signals, said analog signals traversing between six noise-free amplitude values, wherein said finite number of states comprise four finite states.

24. The maximum likelihood detector of claim 15, for third order maximum likelihood detection of said data recorded as analog signals, said analog signals traversing between twelve noise-free amplitude values, wherein said finite number of states comprise four finite states, and wherein said relational logic plurality of difference metrics comprise at least six sets of difference metrics.

25. A maximum likelihood detector for detection of digital samples of data recorded as analog signals representing a finite number of maximum likelihood states in accordance with a finite number of maximum likelihood sample-to-sample path cases, said digital samples representing channel output of said recorded analog signals at a predetermined timing with respect thereto, comprising:

a sample input for receiving said digital samples of said recorded analog signals;

at least two programming sources for providing at least two numerical metric coefficients, said at least two numerical coefficients relating to the probability of said digital samples comprising a data sequence;

sample logic coupled to said sample input and to said at least one programming source, for applying said at least two programmed numerical metric coefficients to each of said digital samples to generate alternative metrics;

relational logic coupled to said sample logic for providing a previous metric which comprises a difference metric function of a previous digital sample derived from difference metrics representing the difference between metrics directly associating "0" and "1" states of said recorded signal;

a selector coupled to said sample logic and to said relational logic for selecting the one of said respective generated alternative metrics which minimizes the mean squared error with respect to said previous metric and for selecting one of said derived difference metrics, whereby said selected derived difference metric comprises said previous metric for a following said digital sample;

a maximum likelihood path memory coupled to said selector, for identifying the one of said finite number of maximum likelihood cases represented by said selected metric, said path memory responding to said identified one of said finite states to set to a maximum likelihood state dictated by said identified one of said finite states, said set maximum likelihood state detecting said recorded analog signals; and an output coupled to said maximum likelihood path memory for signaling said set maximum likelihood state.

26. The maximum likelihood detector of claim 25, for first order maximum likelihood detection of said data recorded as analog signals, said analog signals traversing between four noise-free amplitude values, wherein said finite number of states comprise two finite states.

27. The maximum likelihood detector of claim 25, for second order maximum likelihood detection of said data recorded as analog signals, said analog signals traversing between six noise-free amplitude values, wherein said finite number of states comprise four finite states.

28. The maximum likelihood detector of claim 25, for third order maximum likelihood detection of said data recorded as analog signals, said analog signals traversing between twelve noise-free amplitude values, wherein said finite number of states comprise six finite states.

* * * * *

UNITED STATES PATENT AND TRADEMARK OFFICE
CERTIFICATE OF CORRECTION

PATENT NO.    : 6,424,686 B1
DATED         : July 23, 2002
INVENTOR(S)   : Hutchins et al.

It is certified that error appears in the above-identified patent and that said Letters Patent is hereby corrected as shown below:

Column 8,
Lines 5-6,  Change "$DJ_k = -DJ_{k-1} + 2(\mu_2 - \mu_1) y_k + (\mu_2^2 + \mu_1^2)$"

to -- $DJ_k = -DJ_{k-1} + 2(\mu_2 - \mu_1) y_k + (-\mu_2^2 + \mu_1^2)$ --

Column 12,
Lines 13-16, Change "$Y_k \varepsilon \{a_0 f_0 + a_0 f_1 + a_0 f_2 = \mu_0, a_0 f_0 + a_0 f_1 + a_1 f_2 = \mu_1, a_1 f_0 + a_1 f_1 + a_1 f_2 = \mu_3, a_1 f_0 + a_0 f_1 + a_0 f_2 = \mu_4, a_1 f_0 + a_1 f_1 + a_0 f_2 = \mu_6, a_1 f_0 + a_1 f_1 + a_1 f_2 = \mu_7\}$"

to -- $Y_k \varepsilon \{a_0 f_0 + a_0 f_1 + a_0 f_2 = \mu_0, a_0 f_0 + a_0 f_1 + a_1 f_2 = \mu_1, a_1 f_0 + a_1 f_1 + a_1 f_2 = \mu_3, a_1 f_0 + a_0 f_1 + a_0 f_2 = \mu_4, a_1 f_0 + a_1 f_1 + a_0 f_2 = \mu_6, a_1 f_0 + a_1 f_1 + a_1 f_2 = \mu_7\}$ --

Column 14,
Line 38, change "BV" to -- By --

Signed and Sealed this

Twenty-second Day of April, 2003

JAMES E. ROGAN
*Director of the United States Patent and Trademark Office*